United States Patent [19]

Ogura et al.

[11] Patent Number: 5,372,495
[45] Date of Patent: Dec. 13, 1994

[54] MOLDING MACHINE

[75] Inventors: Masashi Ogura; Mitsuo Yamanoi, both of Utsunomiya, Japan

[73] Assignees: Kao Corporation; Tahara Machinery Limited, both of Tokyo, Japan

[21] Appl. No.: 2,594

[22] Filed: Jan. 11, 1993

Related U.S. Application Data

[62] Division of Ser. No. 742,624, Aug. 8, 1991, Pat. No. 5,229,143.

[30] Foreign Application Priority Data

| Aug. 16, 1990 | [JP] | Japan | 2-86237[U] |
| Aug. 16, 1990 | [JP] | Japan | 2-86238[U] |
| Aug. 16, 1990 | [JP] | Japan | 2-216018 |
| Aug. 16, 1990 | [JP] | Japan | 2-216019 |
| Aug. 16, 1990 | [JP] | Japan | 2-216020 |
| Aug. 16, 1990 | [JP] | Japan | 2-216021 |
| Aug. 16, 1990 | [JP] | Japan | 2-216022 |
| Jun. 27, 1991 | [JP] | Japan | 3-57139[U] |
| Jun. 27, 1991 | [JP] | Japan | 3-57140[U] |
| Jun. 27, 1991 | [JP] | Japan | 3-57141[U] |
| Jun. 27, 1991 | [JP] | Japan | 3-181685 |

[51] Int. Cl.⁵ ...................... B29C 49/58; B29C 49/64
[52] U.S. Cl. ...................... 425/522; 285/31; 425/526; 425/535
[58] Field of Search ............... 425/526, 535, 522, 182, 425/185; 285/31, 80, 200, 918

[56] References Cited

U.S. PATENT DOCUMENTS

| 2,349,176 | 5/1944 | Kopitke | 425/540 X |
| 3,632,267 | 1/1972 | Kader | 425/540 X |
| 3,728,063 | 4/1973 | Langecker | 425/535 X |
| 3,819,317 | 6/1974 | Higginbotham | 425/535 X |
| 3,854,855 | 12/1974 | Pollack et al. | 425/142 |
| 3,936,521 | 2/1976 | Pollack et al. | 264/334 X |
| 3,941,863 | 3/1976 | Pollack et al. | 264/334 X |
| 3,943,214 | 3/1976 | Turek | 425/140 X |
| 3,954,370 | 5/1976 | Pollack et al. | 425/441 X |
| 3,963,404 | 6/1976 | Pollack et al. | 425/436 RM |
| 3,970,418 | 7/1976 | Pollack et al. | 425/140 |
| 4,214,860 | 7/1980 | Kleimenhagen et al. | 425/526 X |
| 4,239,474 | 12/1980 | Nakagawa | 425/532 X |
| 4,421,472 | 12/1983 | Martin, Jr. | 425/541 X |
| 4,484,884 | 11/1984 | Wiatt et al. | 425/535 X |
| 4,569,651 | 2/1986 | Krall | 425/532 |
| 4,592,720 | 6/1986 | Dugan et al. | 425/526 |
| 4,634,366 | 1/1987 | Brun et al. | 425/526 |
| 4,698,012 | 10/1987 | Shelby et al. | 425/541 X |
| 4,801,260 | 1/1989 | Oles et al. | 425/540 X |
| 4,919,607 | 4/1990 | Martin et al. | 425/540 X |

FOREIGN PATENT DOCUMENTS

| 0136367 | 4/1985 | European Pat. Off. |
| 1916868 | 11/1969 | Germany |
| 2424445 | 1/1975 | Germany |
| 2535367 | 2/1976 | Germany |
| 50-111167 | 9/1975 | Japan |
| 61-103660 | 5/1986 | Japan |
| 63-256420 | 10/1988 | Japan |
| 1-34777 | 7/1989 | Japan |
| 1-114136 | 8/1989 | Japan |
| 2-34214 | 3/1990 | Japan |
| 2-48412 | 10/1990 | Japan |

*Primary Examiner*—Richard L. Chiesa
*Attorney, Agent, or Firm*—Frishauf, Holtz, Goodman & Woodward

[57] ABSTRACT

The invention resides in a rotary blow molding machine in which under an extruder for extruding a parison, a turntable is arranged which has plural sets of molds mounted thereon for holding the parison therebetween and blow-molding the parison, the turntable is rotated by a motor, an annular driven gear is provided on the turntable, and one pair of idle gears are made to intervene between the driven gear and a driving gear for transmitting the rotation of the motor so as to intermesh with both the gears.

9 Claims, 23 Drawing Sheets

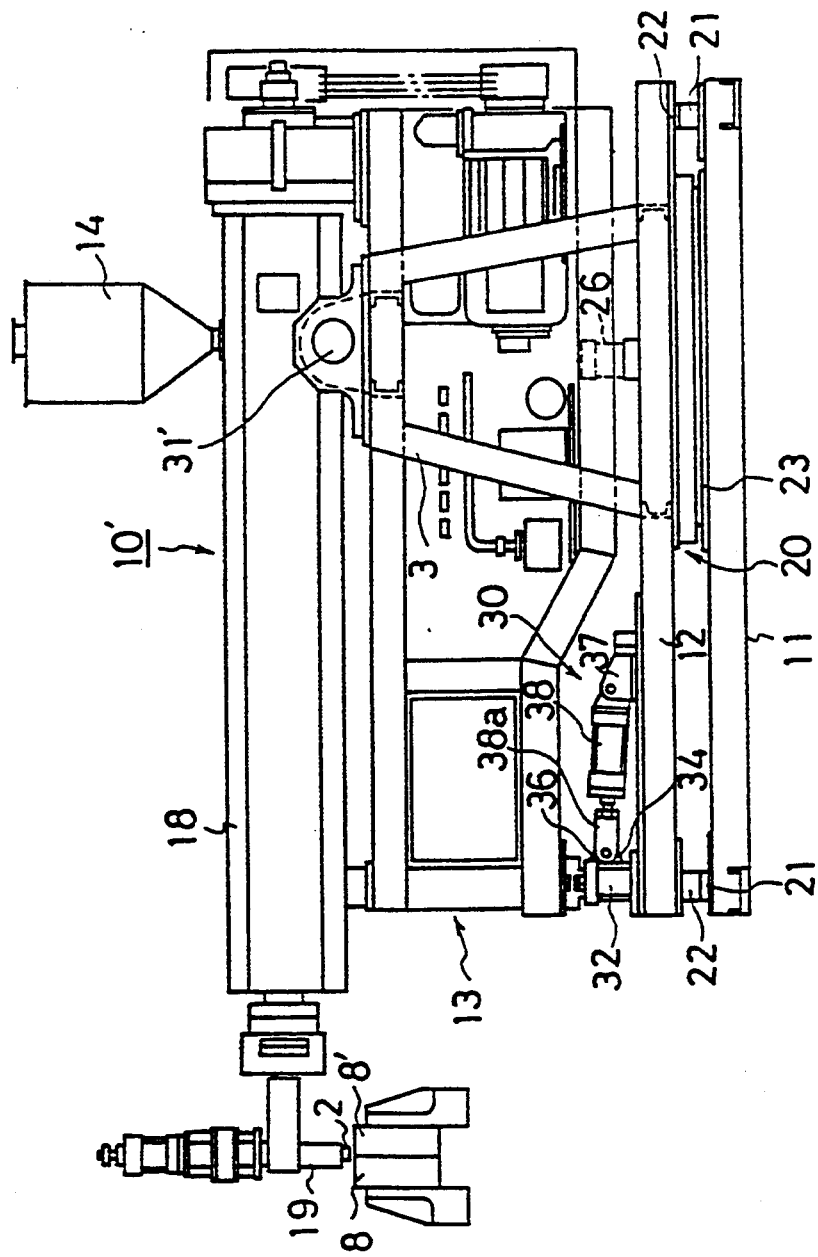

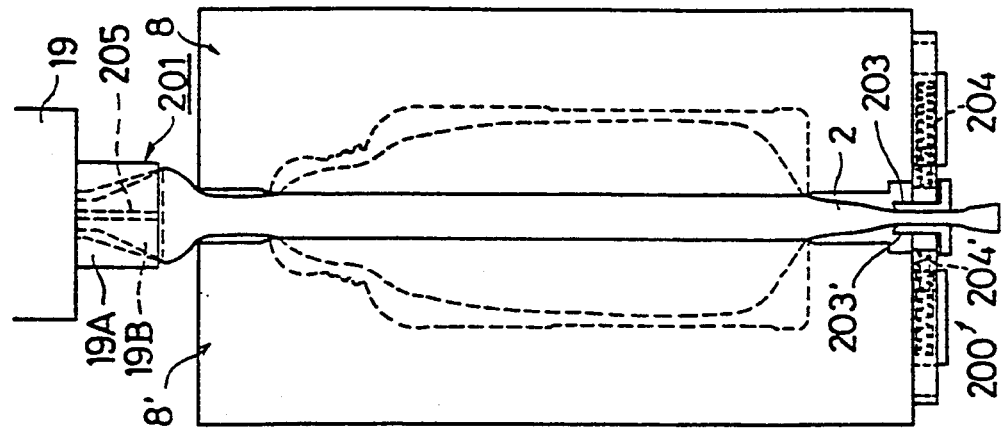
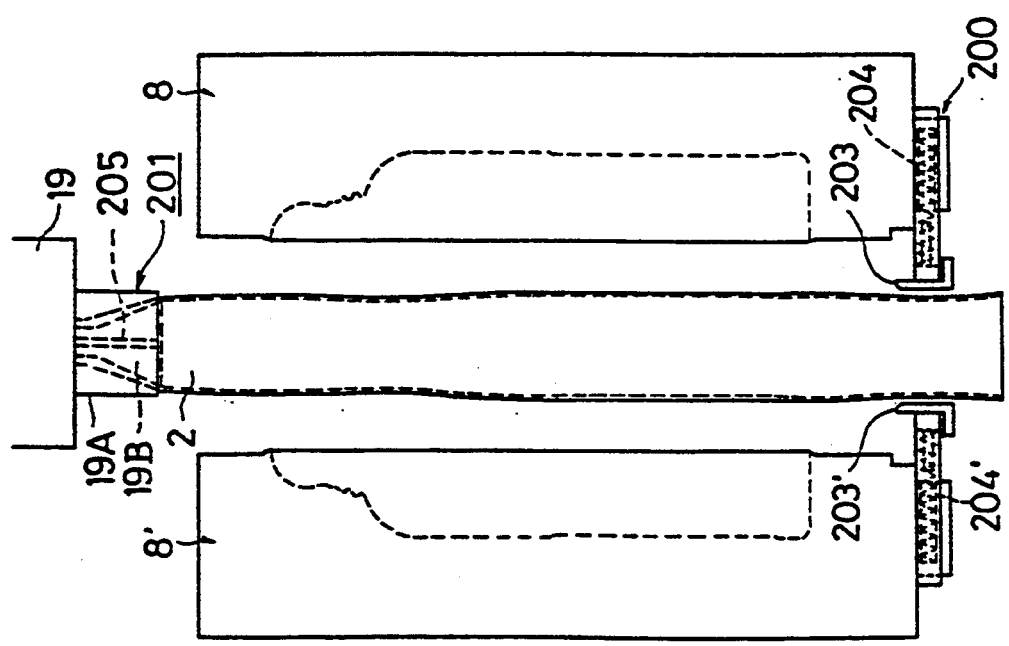

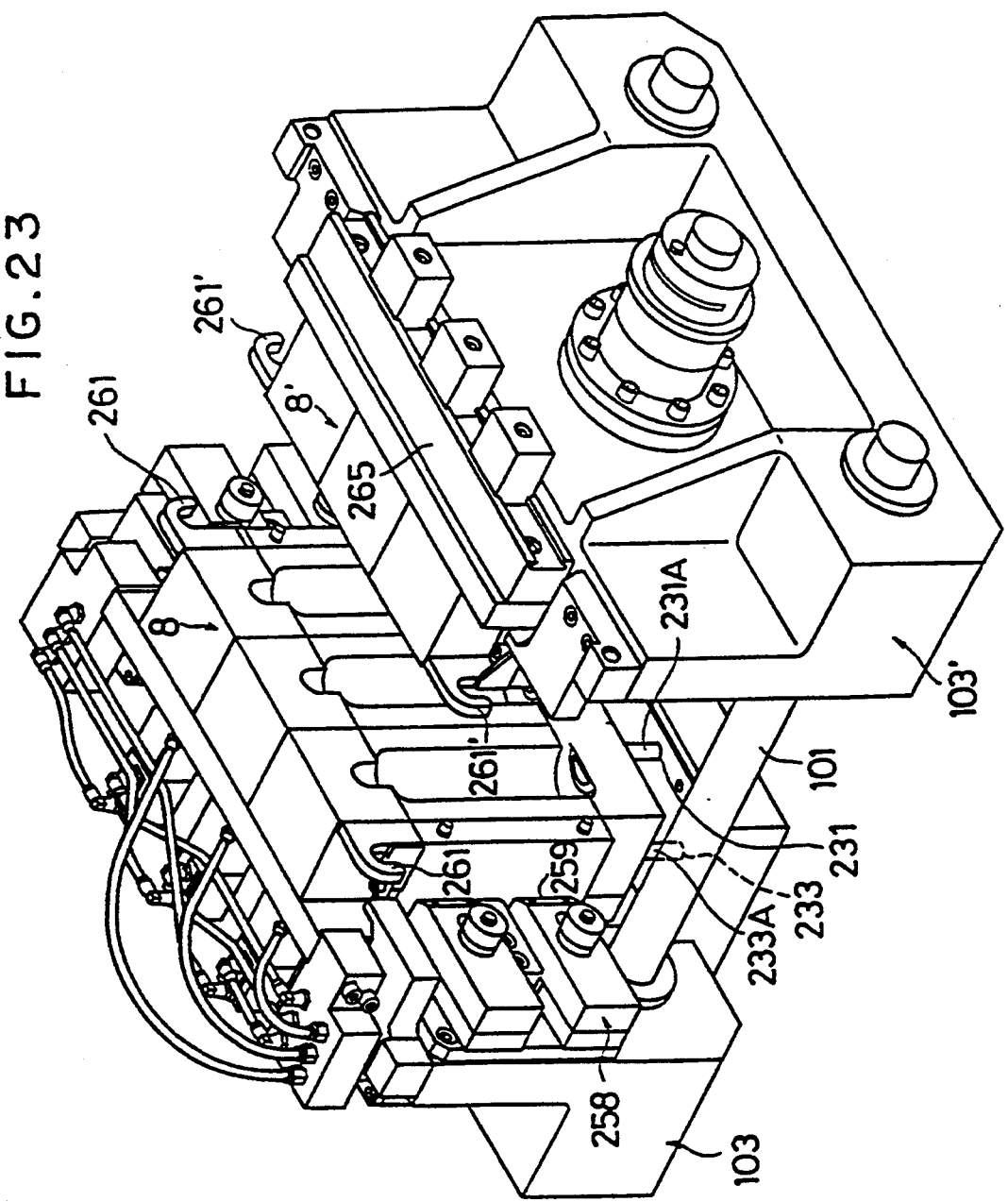

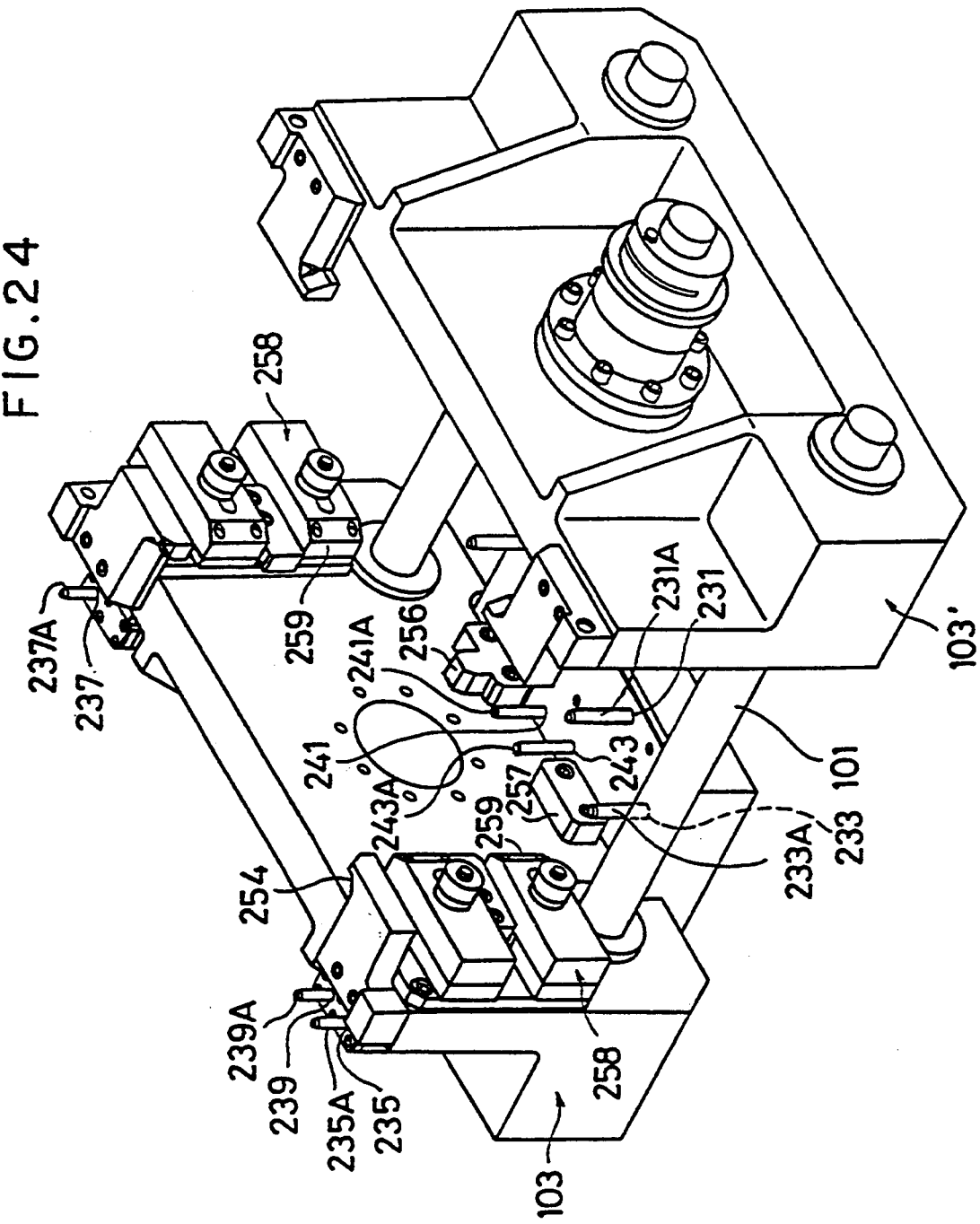

FIG.25A
FIG.25B
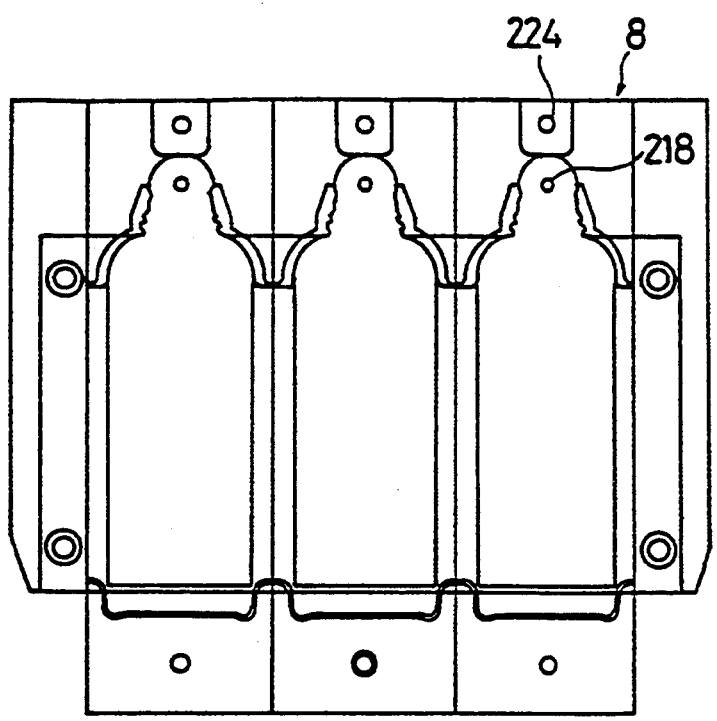
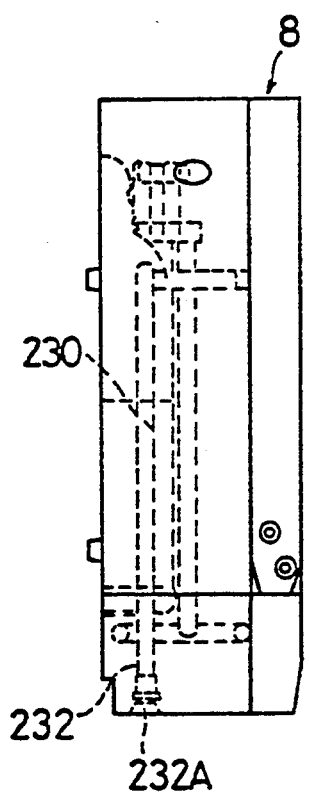
FIG.25C
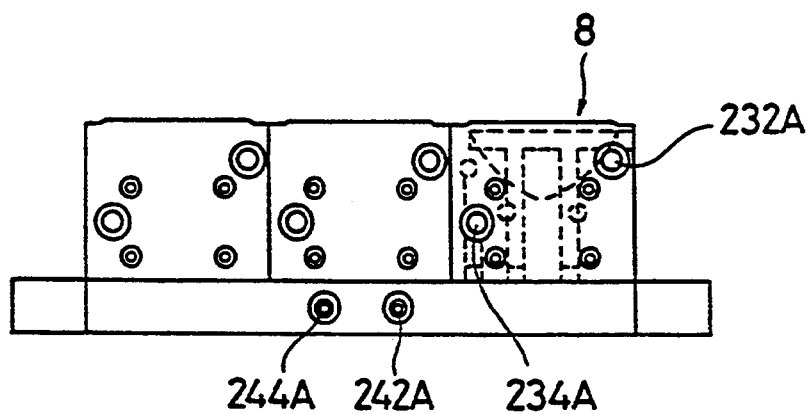

MOLDING MACHINE

This is a division of application Ser. No. 07/742,624 filed Aug. 8, 1991, now U.S. Pat. No. 5,229,143.

BACKGROUND OF THE INVENTION

1. Field of the Invention

The present invention relates to a molding machine for molding detergent containers, cosmetic bottles or the like from parisons.

2. The Prior Arts (A) Turntable driving system of a blow molding machine

For example, there is a rotary blow molding machine in which under an extruder for extruding a parison made of thermoplastic resin downward in the vertical direction, a turntable is arranged which has plural sets of shut-off molds mounted thereon, each set consisting of a pair of the shut-off molds for holding said parison therebetween and blow-molding the parison, and a driving gear for transmitting the rotation of a motor is intermeshed with an annular driven gear provided on the lower part of said turntable, thereby making the turntable intermittently rotatable, wherein hollow articles made of the resin are continuously molded (there is disclosed a similar structure thereto, for example in the official gazette of Japanese Patent Application Laid-open No. 256,420/1988).

In such a conventional rotary blow molding machine in which the driving gear for transmitting the rotation of a motor is directly intermeshed with the annular driven gear of a turntable, however, there is a drawback that the position of said turntable in its intermittent rotation or stoppage can not be positioned with high accuracy due to any backlash of both the gears.

Thus, the present invention is intended to provide a rotary blow molding machine in which the aforementioned problems can be solved.

(B) Parison extruding system of a blow molding machine

For example, there is a rotary blow molding machine in which under an extruder for extruding a parison made of thermoplastic resin downward in the vertical direction, a turntable is arranged which has plural sets of shut-off molds mounted thereon, each set consisting of a pair of the shut-off molds for holding said parison therebetween and blow-molding the parison, and the turntable is lifted up to the extruder side when said parison is fed into each pair of the shut-off molds, and it is lifted down to its original position after the feed of the parison, and said turntable is intermittently rotated by a motor equipped with a driving gear intermeshing with an annular driven gear provided on the turntable, wherein hollow articles made of the resin are continuously molded (there is disclosed a similar structure thereto, for example in the official gazette of Japanese Patent Application Laid-open No. 256,420/1988).

In such a conventional rotary blow molding machine in which a mold lifting mechanism for lifting up the turntable to the extruder side in the feed of a parison, other than a driving mechanism comprising a motor for rotating the turntable and the like, must be installed on the turntable side, however, there is a drawback that the structure of the molding machine on the turntable side is complicated and its weight becomes heavier.

Thus, the present invention is intended to provide a rotary blow molding machine in which the aforementioned problems can be solved.

(C) Extruder turning system of a blow molding machine

When a screw of the extruder for kneading thermoplastic resin is drawn out for cleaning, in the conventional rotary blow molding machine described in the item (A), the pair of said shut-off molds on the turntable and the screw to be drawn out of said extruder interfere with each other, and the turntable must be therefore moved, for instance along a pair of movement rails arranged in the installation place. As a result, there is required a wider installation space.

Thus, the present invention is intended to provide a rotary blow molding machine in which the aforementioned problems can be solved.

(D) Mold clamping unit of a blow molding machine

In the official gazette of Japanese Patent Application Laid-open No. 256,420/1988 aforesaid in the items (A), (B) and (C), there is disclosed a mold clamping unit for a rotary blow molding machine in which parisons made of thermoplastic resin are continuously molded to hollow articles made of the resin by a pair of shut-off molds.

The mold clamping unit of this rotary blow molding machine comprises roughly a bed plate, a pair of guide shafts fixed so as to be parallel on said bed plate by way of a supporting block, a pair of movable plates slidably provided on the pair of said guide shafts, in which said molds are fixed on their opposite surfaces, respectively, a pair of clamp rods fixed at their one end on the back surface side of each movable plate, which contact the respective molds with each other or alienate them from each other, a swing lever swingably supported on a bracket erected at one end of said bed plate by way of a pivot positioned almost at the same height as that of each guide shaft, in which the other end of one clamp rod is pivotally supported at its upper end, and its lower end part is protruded downward from the top surface of said bed plate, a slide rod slidably supported under the bed plate, in which one end thereof is pivotally supported at the other end of the one clamp rod of said swing lever, and a connection plate for connecting the respective other ends of said slide rod and the other clamp rod with each other. After the parison is fed from the extruder, the turntable having each pair of shut-off molds mounted thereon, which are clamped by said mold clamping unit, is intermittently rotated by the motor, wherein hollow articles made of the resin are continuously molded.

In the mold clamping unit of the conventional rotary blow molding machine mentioned above, in which the pivot of the swing lever of the mold clamping unit is positioned at the height of a pair of guide shafts and the pair of said guide shafts are provided nearly midway between the clamp rod and the slide rod, however, there is a drawback that the clamping force of the mold clamping unit can not be divided uniformly by the pair of said guide shafts and the bed plate, with any unnatural load applyed on the bed plate. Furthermore, there is required a complicated retaining means in order to retain the opened or shut state of the pair of said molds.

Thus, the present invention is intended to provide a rotary blow molding machine in which the aforementioned problems can be solved.

(E) Parison cutting unit of a blow molding machine

For example, there is a parison cutting unit of a blow molding machine in which a cutter reciprocated by an air cylinder is provided on an extruder for extruding a parison made of thermoplastic resin downward in the vertical direction, and said cutter is repeatedly moved alternately forward and backward, thereby cutting in order the parison extruded from the extruder into a pair of shut-off molds arranged under said extruder, wherein hollow articles made of the resin are continuously molded.

In the parison cutting unit of such a conventional blow molding machine, in which the cutter is reciprocated by the air cylinder, thereby cutting the parison in order, and the cutting start-up positions in the forward and backward movements of said cutter are different, respectively, however, there is a drawback that each parison can not be cut at the same length at all times.

Thus, the present invention is intended to provide a parison cutting unit of a rotary blow molding machine in which the aforementioned problems can be solved.

(F) Flash shape correcting unit of a blow molding machine, and (G) Molding taking-out unit of a blow molding machine In the official gazette of Japanese Patent Application Laid-open No. 111,167/1975, for example, there is disclosed a rotary blow molding machine in which hollow articles made of thermoplastic resin are continuously molded by use of parisons made of the resin. This rotary blow molding machine has a pair of rotary frames, and has, between the pair of said rotary frames, plural (eight) sets of shut-off molds, each set consisting of a pair of the shut-off molds which are opened or shut by a mold clamping unit. By an extruder positioned above the pair of said rotary frames, a parison is fed in order into each pair of said shut-off molds positioned under said extruder, and after the molds are clamped, said parison is cut off from the extruder by the rotation of the pair of said rotary frames in a given direction, and after the blow molding is carried out, a blow molding is taken out of the pair of said shut-off molds which are opened, by holding a flash of said blow molding by the chuck of a product taking-out unit.

In the conventional rotary blow molding machine mentioned above, which is composed so that the parison fed into the pair of said shut-off molds is cut off from the extruder when the pair of said rotary frames are rotated, however, there is a drawback that the upper end portion of the parison protruded upward from the top surface of the pair of said shut-off molds that will become a flash is easy to fold and bend to the top surface side of the pair of said shut-off molds shut, and said portion becomes a flash of a blow molding after its solidification in this state, and it is therefore difficult to hold said flash and take out said blow molding with the chuck of the product taking-out unit.

Thus, the present invention is intended to provide a rotary blow molding machine in which the aforementioned problems can be solved.

(H) Parison presealing method and unit of a blow molding machine

In the official gazette of Japanese Patent Publication No. 34,777/1989, there is disclosed a blow molding machine composed so as to have an extruder for extruding and hanging down a parison, a presealing device for presealing one end part of said parison, a preblowing device for preblowing a blow gas into the presealed parison, a pair of molds for holding said parison therebetween and closing both end parts of the parison, and a blowing device for injecting the blow gas into the parison enclosed in the molds until the parison accords with the cavity of said molds.

The reason why said parison is previously imparted with a given expansion by presealing and preblowing the parison is that when the parison is held between the molds and a blow needle of the blowing device is punctured into the parison, a sufficient space is formed between two parison skins so that said blow needle punctures only one parison skin of the annular parison and it does not puncture two parison skins thereof. If the blow needle punctures the two parison skins, it is impossible to inject the blow gas between the two parison skins of the same parison.

In the prior art, however, the presealing device is provided on the upper end part of a pair of molds and said one end part of a parison is presealed in the upper part of the pair of said molds.

Accordingly in the prior art, there are the following problems (1) to (3).

(1) The presealing of a parison is carried out in the upper part of the molds, i.e. just under the extruder. Therefore, the parison undergoes a strong bending action just under the dies and core which are the outlet of said extruder by the presealing device, and as a result, some ring mark flaws caused by this strong bending are formed on the inside and outside surfaces of the parison. Thus, a lower flash to be cut at the lower end part of the parison becomes larger, reducing the yield.

(2) At the stage where a parison is presealed, the parison is only extruded at a short length corresponding to the lower end part of a molding. When the preblowing is carried out simultaneously with the presealing, only the portion of the parison corresponding to the lower end of a molding is expanded and as a result, it is impossible to impart to said parison an expansion due to the preblowing that is uniform in the whole the parison. In the prior art, accordingly, the control of preblowing is complicated, for instance which comprises, after the lapse of the presealing, starting up the preblowing, with waiting such a time that the lower end part of the parison reaches the vicinity of the lower part of the molds.

(3) If the extrusion of a parison is not carried out with blowing air into the parison, after the parison is sealed in the upper part of the molds, the inside of the parison will be negative in pressure and a molding will be inferior. Also in a cace the preblowing is not positively carried out, there is therefore required a preblowing device (which may be an atmosphere release passage) in order to prevent the negative pressure state in the inside of the parison.

It is, therefore, an object of this invention to obtain a superior molding by presealing a parison, with no formation of any ring mark flaw or the like thereon, and blow-molding said parison while air is enclosed in the parison, and to enable to simplify the control of preblowing when the preblowing is carried out.

(I) Ejector-contained molds of a molding machine

A molding machine has hitherto an ejector provided therein such as a blow needle or ejector pin.

In the official gazette of Japanese Utility Model Application Laid-open No. 114,136/1989, there is disclosed a molding machine in which an ejector pin driving part is provided on a mold fixture plate side and an ejector pin is provided on a mold side.

In a conventional blow molding machine, in addition, a blow needle driving part and a blow needle are provided on the mold fixture plate side.

In the prior art in which an ejector pin driving part is provided on the mold fixture plate side and an ejector pin on mold side, respectively, however, it is necessary to carry out an attaching and detaching work for the ejector pin driving part and the ejector pin, when the molds are attached on or detached from the mold fixture plate. And, it is difficult to ensure the smooth motion of the ejector pin, because of the presence of a mechanical looseness and an error in assemblying position in a portion where the ejector pin driving part and the ejector pin are attached or detached.

In the prior art in which a blow needle driving part and a blow needle are provided on the mold fixture plate side, furthermore, it is necessary to carry out a work of inserting the blow needle on the mold fixture plate side into a blow needle guide hole on the mold side, when the molds are attached on or detached from the mold fixture plate. And, it is difficult to ensure the smooth motion of the blow needle, because of the presence of an error in assemblying position between the blow needle on the mold fixture plate side and the blow needle guide hole on the mold side.

It is, therefore, an object of this invention to eliminate the setting work of an ejector such as a blow needle or ejector pin when molds are attached on or detached from a mold fixture plate, whereby the exchanging workability of the molds can be made satisfactory and the smooth motion of said ejector can be ensured.

(J) Mold pipe line connecting structure of a molding machine

In the official gazette of Japanese Patent Publication No. 48,412/1990, there is disclosed, as the mold pipe line connecting structure of a molding machine, such a connecting structure that an inlet and an outlet for a temperature regulating flow passage are opened in a clamp provided on a mold fixture plate side so as to press and hold molds against said mold fixture plate, and an inlet and an outlet for the temperature regulating flow passage are opened also on the surface of said molds pressed down by said clamp, wherein when the molds are fastened and fixed on the mold fixture plate by the clamp, both the inlets and outlets are communicated with each other in such a state that a sealing material is held under pressure between the mating surfaces of both said inlets and outlets.

According to this prior art, the pipe line on the mold fixture plate side and the pipe line on the mold side can be compactly connected at the same time when the molds are fixed onto the mold fixture plate.

In this prior art, however, there are the following problems (1) and (2).

(1) The exchanging workability of molds is inferior, because it is necessary to confirm that the inlet and outlet on the mold side accord with the inlet and outlet on the clamp side, when the clamp is fastened and fixed.

(2) Since a sealing material is held under pressure between the mating surfaces of the inlet and outlet on the mold side and the inlet and outlet on the clamp side, it is necessary to accompany a fastening and fixing means such as a bolt for each pair of these inlets and outlets. In a case the molds and clamp have plural pairs of pipe lines, the exchanging workability of the molds is inferior, because it takes a long working time.

It is, therefore, an object of this invention to simplify a pipe line connecting work when the pipe line on a mold fixture plate side and the pipe line on a mold side are compactly connected simultaneously with the fixing of the molds to the mold fixture plate, whereby the exchanging workability of the molds can be made satisfactory.

(K) Mold hanging structure of a molding machine

In the official gazette of Japanese Patent Application Laid-open No. 103,660/1986, there is disclosed a molding machine in which a hanger equipped with a device for moving and regulating a center of gravity is used to enable to hang up a pair of molds horizontally.

The official gazette of Japanese Utility Model Application Laid-open No. 34,214/1990 discloses a molding machine in which retainers provided in one pair of molds, respectively are retained with each other, thereby restraining the pair of said molds from opening when the molds are hung up.

In the prior art described in the official gazette of Japanese Patent Application Laid-open No. 103,880/1986, however, the molding machine becomes complicated in constitution, because a hanger must be equipped with a device for moving and regulating the center of gravity in order to enable to hang up a pair of molds horizontally.

In the prior art described in the official gazette of Utility Model Application Laid-open No. 34,214/1990, there is really no constitution for enabling to hang up a pair of molds horizontally, so that the molds may be inclined when they are hung up. Also in this prior art, the molding machine becomes complicated in constitution, because an especial retainer for restraining said molds from opening must be fixed on each of the molds in order to restrain the molds from opening.

It is, therefore, an object of this invention to enable to hang up a pair of molds horizontally by means of a simple constitution.

Furthermore, it is a further object of this invention to enable to restrain the molds from opening when they are hung up, by means of a simple constitution.

SUMMARY OF THE INVENTION (A) Turntable driving system of a blow molding machine The invention resides in a rotary blow molding machine in which under an extruder for extruding a parison, a turntable is arranged which has plural sets of molds mounted thereon for holding said parison therebetween and blow-molding the parison, and said turntable is rotated by a motor, characterized in that an annular driven gear is provided on said turntable, and one pair of idle gears are made to intervene between said driven gear and a driving gear for transmitting the rotation of said motor so as to intermesh with both said gears.

According to this invention, there will be obtained the following operational effect (1).

(1) By the pair of said idle gears made to intervene between the annular driven gear provided on the turntable and the driving gear for transmitting the rotation of the motor so as to intermesh with both the same gears, there will be eliminated any backlash between the respective gears. Due to the elimination of such backlash, the positioning of said turntable in its rotation or stoppage can be carried out with high accuracy.

(B) Parison extruding system of a blow molding machine

The invention resides in a rotary blow molding machine in which under an extruder for extruding a parison, a turntable is rotatably arranged which has plural sets of molds mounted thereon for holding said parison therebetween and blow molding the parison, characterized in that said extruder comprises a base and an extruder body provided on said base, which is moved in the vertical direction by a lifting drive mechanism and feeds said parison into the molds when lifted down.

According to this invention, there will be obtained the following operational effect (2).

(2) Since the lifting drive mechanism is provided on the extruder side to avoid the interference of the parison and molds, the structure of the molding machine on the turntable side will become simple and lighter.

(C) Extruder turning system of a blow molding machine

The invention resides in a rotary blow molding machine in which under an extruder for extruding a parison, a turntable is rotatably arranged which has plural sets of molds mounted thereon for holding said parison therebetween and blow-molding the parison, characterized in that a turning drive mechanism for turning said extruder in the horizontal direction with respect to said turntable is provided on said extruder.

According to this invention, there will be obtained the following operational effect (3).

(3) In a case where the extruder is cleaned, the extruder is turned with respect to the turntable by the turning drive mechanism. By the turning of said extruder, it can be easily cleaned, because the extruder and the molds on the turntable do not interfere with each other. Since the extruder is made turnable with respect to the turntable, the installation space for the rotary blow molding machine will be saved.

(D) Mold clamping unit of a blow molding machine

The invention resides in a rotary blow molding machine in which under an extruder for extruding a parison, a turntable is rotatably arranged which has plural sets of shut-off molds mounted thereon, each set consisting of one pair of the shut-off molds for holding said parison therebetween and blow-molding the parison, and a mold clamping unit for opening and shutting the pair of said shut-off molds is arranged on said turntable by way of a bed plate, characterized in that said mold clamping unit comprises a pair of guide shafts fixed so as to be parallel on said bed plate by way of a supporting block, a pair of movable plates slidably provided on the pair of said guide shafts, in which said molds are fixed on their opposite surfaces, respectively, a pair of clamp rods fixed at their one end on the back surface side of each movable plate, which contact the respective molds with each other or alienate them from each other, a swing lever swingably supported on a bracket erected at one end of said bed plate by way of a pivot positioned below the height of the respective guide shafts, in which the other end of one clamp rod is pivotally supported at its upper end, and its lower end part is protruded below the top surface of said bed plate, a slide rod slidably supported under the bed plate, in which one end thereof is pivotally supported on the lower end of said swing lever spaced equidistantly to the distance between the other end of the one clamp rod and the pivot, a connection plate for connecting the other ends of said slide rod and said other clamp rod with each other, said connection plate being made movable reciprocatingly by a pair of actuators, and a toggle mechanism which shuts the pair of said shut-off molds with the forward movement of said connection plate and opens them with the backward movement of said connection plate, and retains their state.

According to this invention, there will be obtained the following operational effect (4).

(4) Since the pivot of the swing lever of said mold clamping unit is positioned below the height of the pair of said guide shafts, the distance between said pivot and the pin pivotally supporting point of an intermediate link at the other end of the one clamp rod and the distance between said pivot and the pin pivotally supporting point of an intermediate link on the slide rod are made equidistant, and said pivot is provided midway between the position of the pair of said guide shafts and the position of the top surface of said bed plate, the clamping force of said mold clamping unit will be uniformly divided by the pair of said guide shafts and the bed plate, with no unnatural load applied on the bed plate and the like. Furthermore, the opened or shut state of the pair of said shut-off molds can be positively retained by the toggle mechanism.

(E) Parison cutting unit of a blow molding machine

The invention resides in a parison cutting unit of a blow molding machine in which under an extruder for extruding a plurality of parisons, molds are arranged which hold said parison therebetween and blow-mold the parison, and said parison is cut at a position above the top surface of said molds by a cutter, characterized in that said cutter is made rotatable in one direction by an actuator, and a cutter positioning mechanism for determining the cutting start-up position of said cutter is provided on said actuator.

According to this invention, there will be obtained the following operational effect (5).

(5) Since the cutting start-up position of said cutter is determined always at a given position by the cutter positioning mechanism and the cutter is rotated always in one direction by the actuator, the respective parisons can be cut at the same length at all times.

(F) Flash shape correcting unit of a blow molding machine

The invention resides in a blow molding machine in which under an extruder for extruding a parison, molds are arranged which hold said parison therebetween, and said parison is cut at a position above the top surface of said molds by a cutter, whereby a molding is molded so as to have an upper flash on its upper part, characterized in that above said molds, a flash shape correcting mechanism is arranged which corrects the upper end of said parison that is not solidified still to a flatly standing state.

According to this invention, there will be obtained the following operational effect (6).

(6) The upper end of a parison extruded above the top surface of the molds is corrected to a flatly standing state by the flash shape correcting mechanism, before it is solidified.

(G) Molding taking-out unit of a blow molding machine

The invention resides in a blow molding machine in which under an extruder for extruding a parison, molds are arranged which hold said parison therebetween, and said parison is cut at a position above the top surface of said molds by a cutter, whereby a molding is molded so as to have an upper flash on its upper part, characterized in that above said molds, a flash shape correcting mechanism is arranged which corrects the upper end of said parison that is not solidified still to a flatly standing state, and a molding taking-out unit is arranged which takes out said molding from the molds by holding its upper flash left after the blow molding.

According to this invention, there will be obtained the following operational effect (7).

(7) The upper end of a parison protruded above the top surface of the molds is corrected to a flatly standing state by the flash shape correcting mechanism before it is solidified, and said molding is easily taken out without failure by the molding taking-out unit.

(H) Parison presealing method and unit of a blow molding machine

The invention resides in a method which comprises hanging down a parison extruded from an extruder, holding under pressure one end part of said parison to preseal the parison, and then holding the parison by a pair of molds, thereby closing both the end parts of said parison, and injecting a blow gas into the closed parison until the parison accords with the cavity of said molds, characterized in that the one end part of said parison is presealed in the lower part of the pair of said molds.

The invention resides in a method of the invention according to claim 8, which comprises further holding under pressure one end part of said parison to preseal the parison, and preblowing the blow gas into the parison.

The invention resides in a unit which comprises an extruder for extruding and hanging down a parison, a presealing device for presealing one end part of said parison, a pair of molds for holding the parison therebetween to close both end parts of said parison, and a blowing device for injecting a blow gas into the closed parison in said molds until said parison accords with the cavity of the molds, characterized in that the presealing device is provided on the lower end part of the pair of said molds, and composed so as to hold under pressure the one end part of said parison in the intermediate course of shutting the molds so that it is presealed.

The invention resides in a unit of the invention, which has further a preblowing device for preblowing the blow gas into the presealed parison.

According to this invention, there will be obtained the following operational effects (8) to (10).

(8) The presealing of a parison is carried out in the lower part of molds, i.e. at a position that is most apart from the extruder. When the parison is presealed, accordingly, it does not undergo any strong bending action just under the dies and core, with no formation of any ring mark flaw. As a result, a lower flash to be removed in the lower end part of the parison can be made smaller, and the yield can be improved.

(9) At the stage where a parison is presealed, the parison has been extruded at a length corresponding to the whole length of a molding and the whole of said parison is uniformly expanded by preblowing. Accordingly, the preblowing can be carried out throughout the whole course of extrusion of a parison, wherein the preblowing before the presealing serves merely to perforate and release the parison, and the preblowing after the presealing serves to expand the whole of the parison uniformly. Namely, it is possible to simplify the control of preblowing, because there is no need of monitoring the timing of starting the preblowing.

(10) Since the parison is presealed after it has been extruded at a length corresponding to the whole length of a molding, the parison can be blow-molded while air is enclosed in the parison. But, in a case the preblowing is not positively carried out, it is possible to obtain superior moldings, with no preblowing device required.

(I) Ejector-contained mold of a molding machine

The invention resides in an ejector-contained mold of a molding machine in which when an ejector is provided in a mold to be fixed on a mold fixture plate, said ejector and an ejector driving part are contained in said mold.

The invention resides in an invention, in which the ejector is a blow needle which is punctured into a parison in the mold to inject a blow gas into said parison.

The invention resides in an invention, in which the ejector is an ejector pin for ejecting a molding in the mold.

According to this invention, there will be obtained the following operational effects (11) and (12).

(11) Since an ejector such as a blow needle or ejector pin and an ejector driving part are contained in the mold, there is no need of carrying out a setting work which comprises inseting the ejector into the guide hole of the mold and attaching or detaching the ejector and the ejector driving part, when the mold is attached on or detached from the mold fixture plate. Namely, the exchanging workability of the mold can be made satisfactory.

(12) An ejector such as a blow needle or ejector pin is previously inserted through the guide hole in the mold, and previously integrated with its driving part in the mold. Accordingly, the smooth motion of such an ejector can be ensured, with no possibility of accompanying any error in assemblying position between the ejector and the guide hole, or any mechanical looseness in a portion where the ejector and ejector driving part are attached or detached and any error in assemblying position between them.

(J) Mold pipe line connecting structure of a molding machine

The invention resides in a mold pipe line connecting structure of a molding machine in which a pipe line provided in a mold fixture plate and a pipe line provided in molds are connected with each other under the state that the molds are fixed on the mold fixture plate, characterized in that the connection end of one pipe line, of a pair of pipe lines to be connected with each other, is made to be a male connecting part, and the connection end of the other pipe line is made to be a female connecting part, and both the connecting parts are made insertable by way of a sealing material.

The invention resides in an invention in which the mold fixture plate and the molds have plural pairs of pipe lines, and the connecting directions of the male connecting part and female connecting part in the respective pairs of the pipe lines are the same direction between the pairs of the pipe lines.

The invention resides in an invention in which the male connecting part comprises a connecting pipe which is flexibly planted in the mold fixture plate or molds.

According to this invention, there will be obtained the following operational effects (13) to (16).

(13) The pipe line on the mold fixture plate side and the pipe line on the mold side will be smoothly connected by carrying out the male-female insertion of their male connecting part and female connecting part in the course of fixing the molds onto the mold fixture plat.

(14) In the above item (13), the male connecting part and female connecting part are inserted by way of a sealing material, whereby the liquid- or gas-tightness can be kept between them simultaneously with their insertion. In order to ensure the liquid- or gas-tightness between the connecting parts, accordingly, there is no need of accompanying such a work of holding under pressure with the sealing material placed between the connecting parts by a bolt or the like.

(15) In the case a plural pairs of pipe lines are provided, the connecting directions of a male connecting part and a female connecting part in the respective pairs of pipe lines are set to be the same direction between the pairs of the pipe lines. Accordingly, the connection of all the pairs of said pipe lines can be completed only by approaching the molds to the mold fixture plate along the aforesaid connecting direction of the male connecting part and female connecting part, in the course of fixing the molds onto the mold fixture plate.

(16) Since the male connecting part is flexibly planted in the mold fixture plate or molds, the male-female insertion of the male connecting part into the female connecting part can be smoothly started up, even if the attaching and inserting position of the molds to the mold fixture plate is rough.

(K) Mold hanging structure of a molding machine

The invention resides in a mold hanging structure of a molding machine in which a hanging retainer part is provided on a pair of molds, respectively, and the pair of said molds are hung up by a hanger retained on both these hanging retainer parts, characterized in that the central position between both the hanging retainer parts is set so as to position on the line of the synthesized center of gravity of the pair of said molds.

The invention resides in an invention in which a balance weight is provided on at least one mold of the pair of said molds.

The invention resides in an invention in which the hanger is equipped with a mold opening restraint part which is engaged with each side part-of both the hanging retainer parts to restrain the pair of said molds from opening.

According to this invention, there will be obtained the following operational effects (17) to (19).

(17) Since the central position between both the hanging retainer parts provided on a pair of molds, respectively, is set so as to position on the line of the synthesized center of gravity of the pair of said molds, the pair of said molds can be horizontally hung up only by retaining both the hanging retainer parts by the hanger and hanging them up.

(18) By the provision of a balance weight on at least one mold, the line of the synthesized center of gravity of the pair of said molds can be made to almost accord with the mating surfaces of both the molds, and as a result, the respective hanging retainer parts provided on the molds can be placed closely to each other in the vicinity of their mating surfaces. Accordingly, the hanger to be retained on these hanging retainer parts can be compact.

(19) In the case each of the hanging retainer parts does not position on the line of the individual center of gravity of each mold, the gravity which is applied on each mold when the molds are hung up creates a moment around the hanging retainer part opposite thereto so that the pair of said molds are apt to open mutually at their lower parts. At that time, according to this invention, the mold opening restraint part of the hanger is engaged with each side part of both the hanging retainer parts to restrain the pair of said molds from opening, whereby the molds can be restrained from opening, without using any special opening restrainer.

BRIEF DESCRIPTION OF THE DRAWINGS

FIG. 19 is a side view of an extruder of another embodiment.

FIG. 20A is a side view of a mold in an open position and equipped with a presealing device.

FIG. 20B is a side view of a mold in a closed, clamping position and equipped with a presealing device.

FIG. 23 is a perspective view showing the state of the molds wherein the fixing of them to the mold fixture plate is completed.

FIG. 24 is a perspective view of the same mold fixture plate.

FIG. 25A is a schematic front elevational view of the same molds.

FIG. 25B is a schematic side elevational view of the molds of FIG. 25A.

FIG. 25C is a schematic top plan view of the molds of FIG. 25A.

DESCRIPTION OF THE PREFERRED EMBODIMENT

Figure 1:
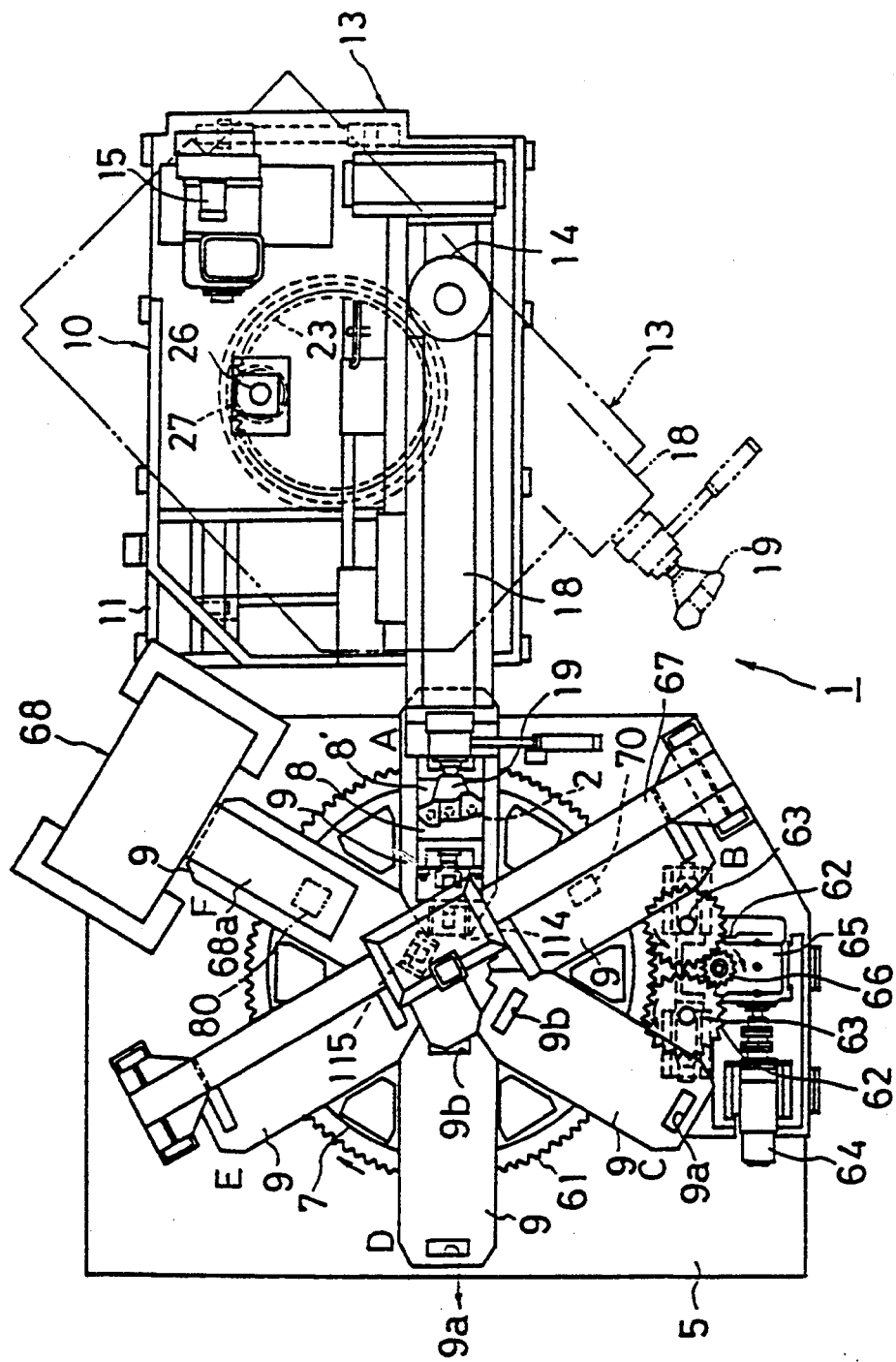
FIG. 1 is a plan view of a rotary blow molding machine showing one embodiment of this invention.

Referring to the drawings, one embodiment of the present invention will be described in detail.

Figure 8:
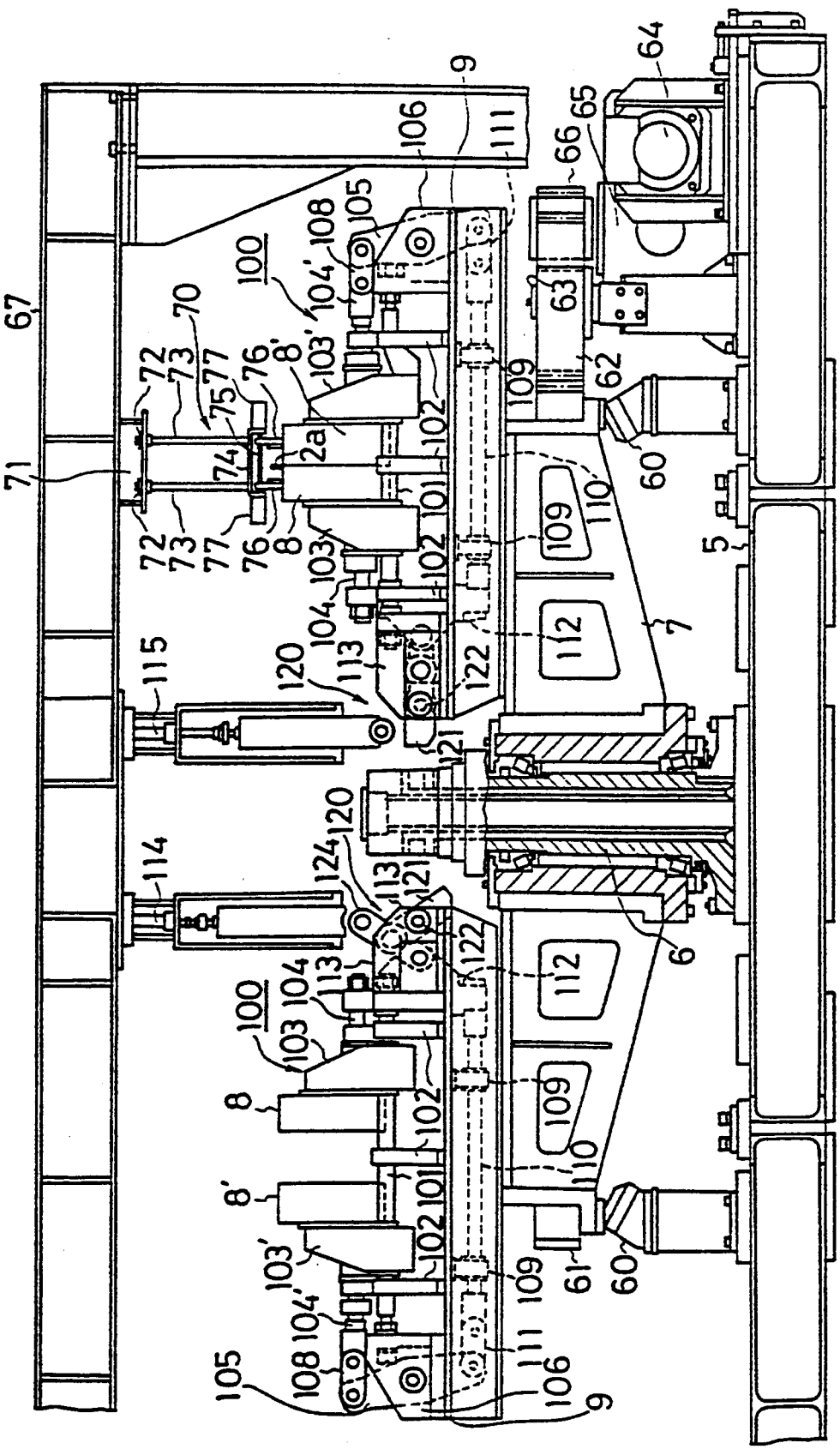
FIG. 8 is a side view of a mold clamping unit of the same blow molding machine.
Figure 11:
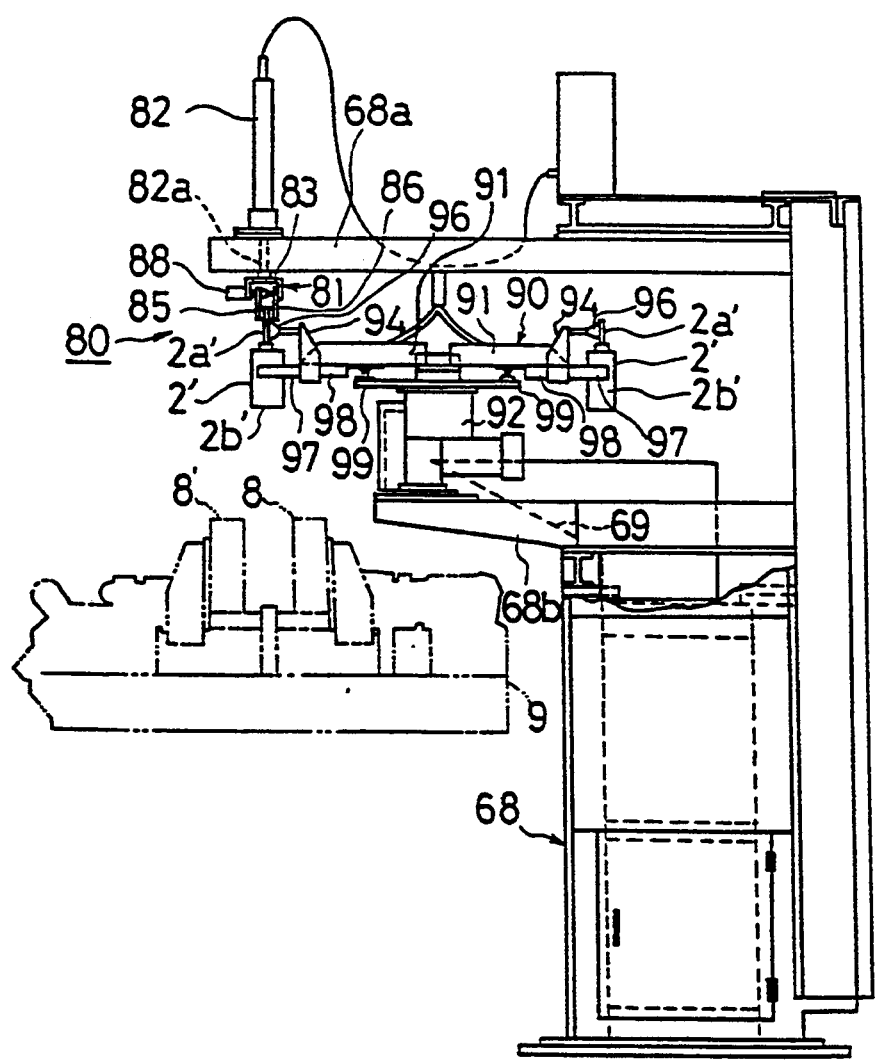
FIG. 11 is a side view of a molding taking-out unit of the same blow molding machine.
Figure 12:
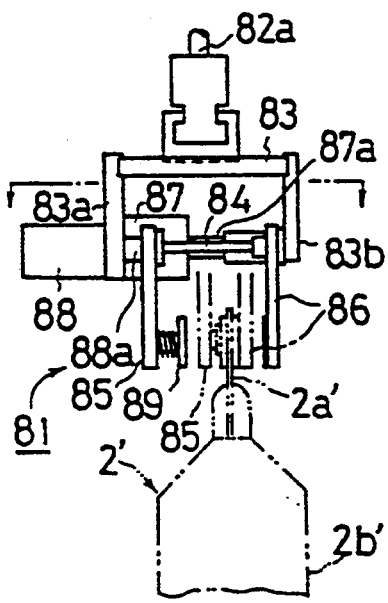
FIG. 12 is a side view of an upper flash clamping and taking-out mechanism of the molding taking-out unit of the same blow molding machine.
Figure 13:
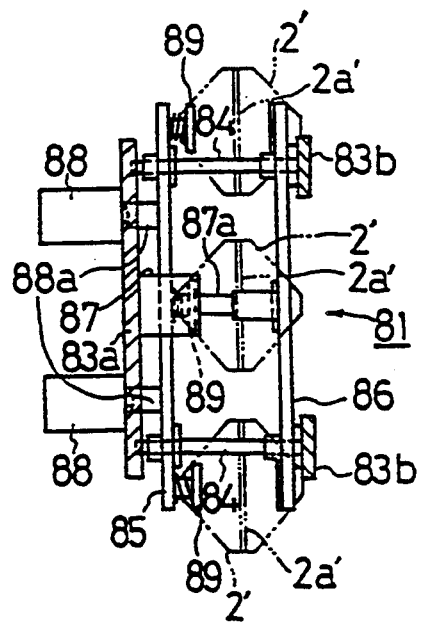
FIG. 13 is a cross-sectional view taken along the line XIII—XIII in FIG. 12.
Figure 14:
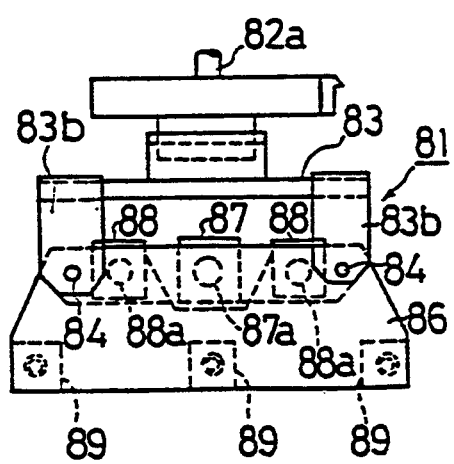
FIG. 14 is a front view of the same upper flash clamping and taking-out mechanism.

In FIG. 1, the reference numeral 1 represents a rotary blow molding machine which has an extruder 10 for extruding a tubular melt parison 2 made of thermoplastic resin downward in the vertical direction. On a turn table 7 rotatably supported on a base 5 placed beside the extruder 10 by way of a supporting shaft 6 (see: FIG. 8), there are mounted six sets of shut-off molds 8, 8', each set consisting of a pair of the shut-off molds for holding said melt parison 2 therebetween and blow-molding the parison, respectively by way of each bed plate 9, where each pair of the shut-off molds 8, 8', of the six sets of them, are intermittently rotated to turn one time in order in a section from the station A to the station F shown in FIG. 1, so that said melt parison 2 can be continuously blow-molded, for example to a molding 2' (see: FIG. 11) such as a detergent container or cosmetic bottle.

As shown in FIG. 1 to FIG. 4, the extruder 10 comprises roughly a down base 11, an upper base 12 provided on this down base 11 so as to be turnable in the horizontal direction with respect to the down base 11 by a turning drive mechanism 20, and an extruder body 13 which is reciprocatingly moved on this upper base 12 in the vertical direction by a lifting drive mechanism 30 and feeds the melt parison 2 into the pair of said shut-off molds 8, 8' when lifted down.

Figure 2:
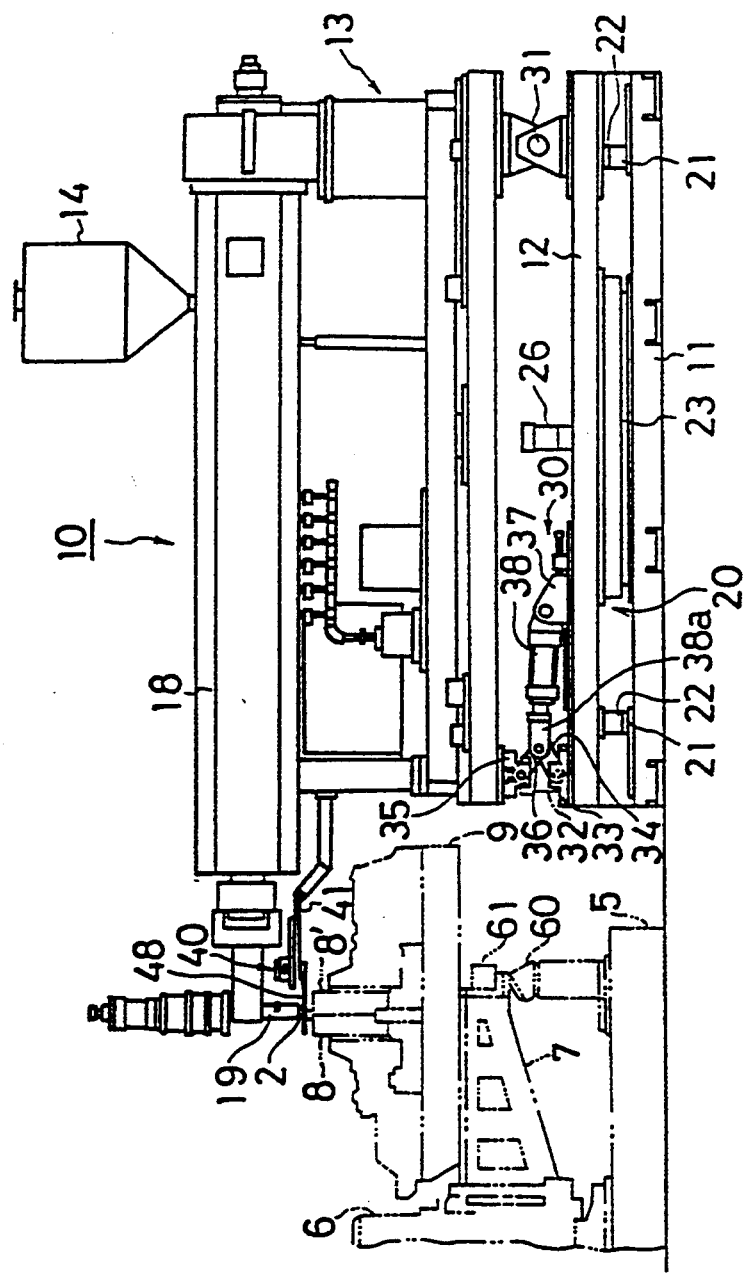
FIG. 2 is a side view of an extruder of the same blow molding machine.
Figure 3:
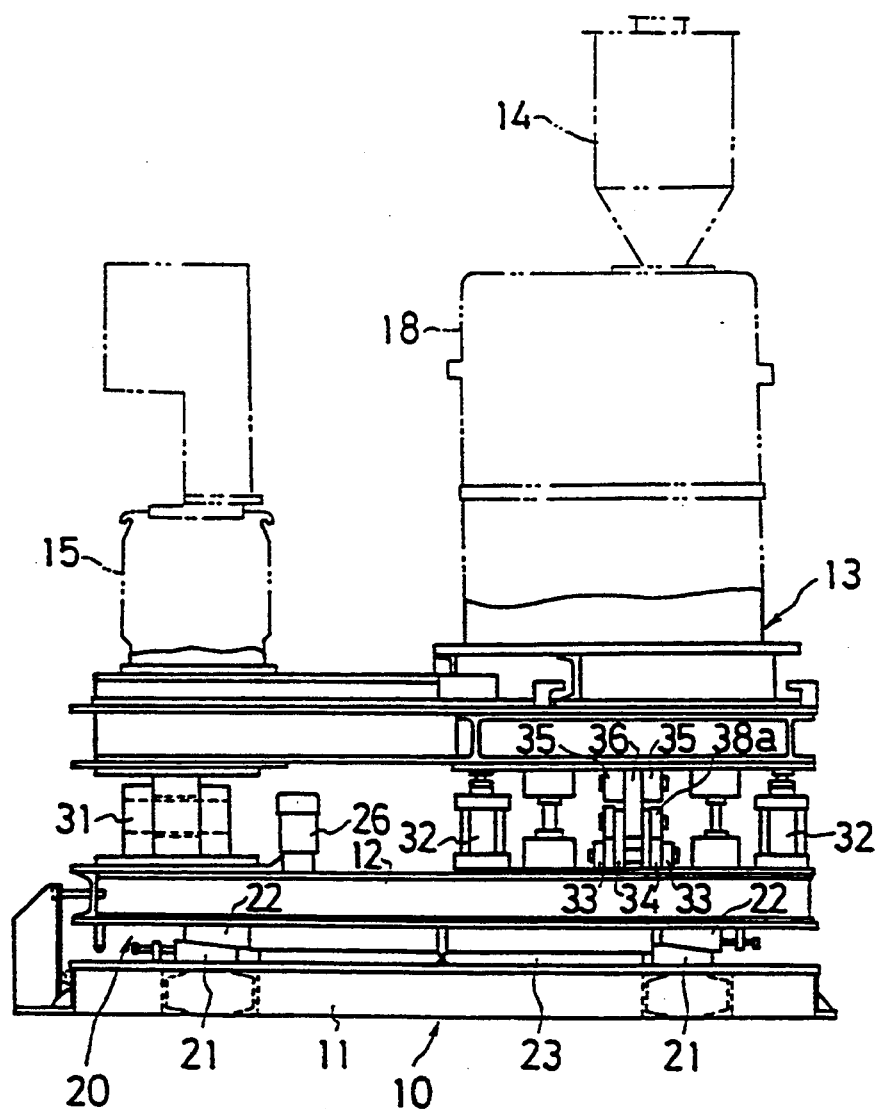
FIG. 3 is a front view of the same extruder.
Figure 4:
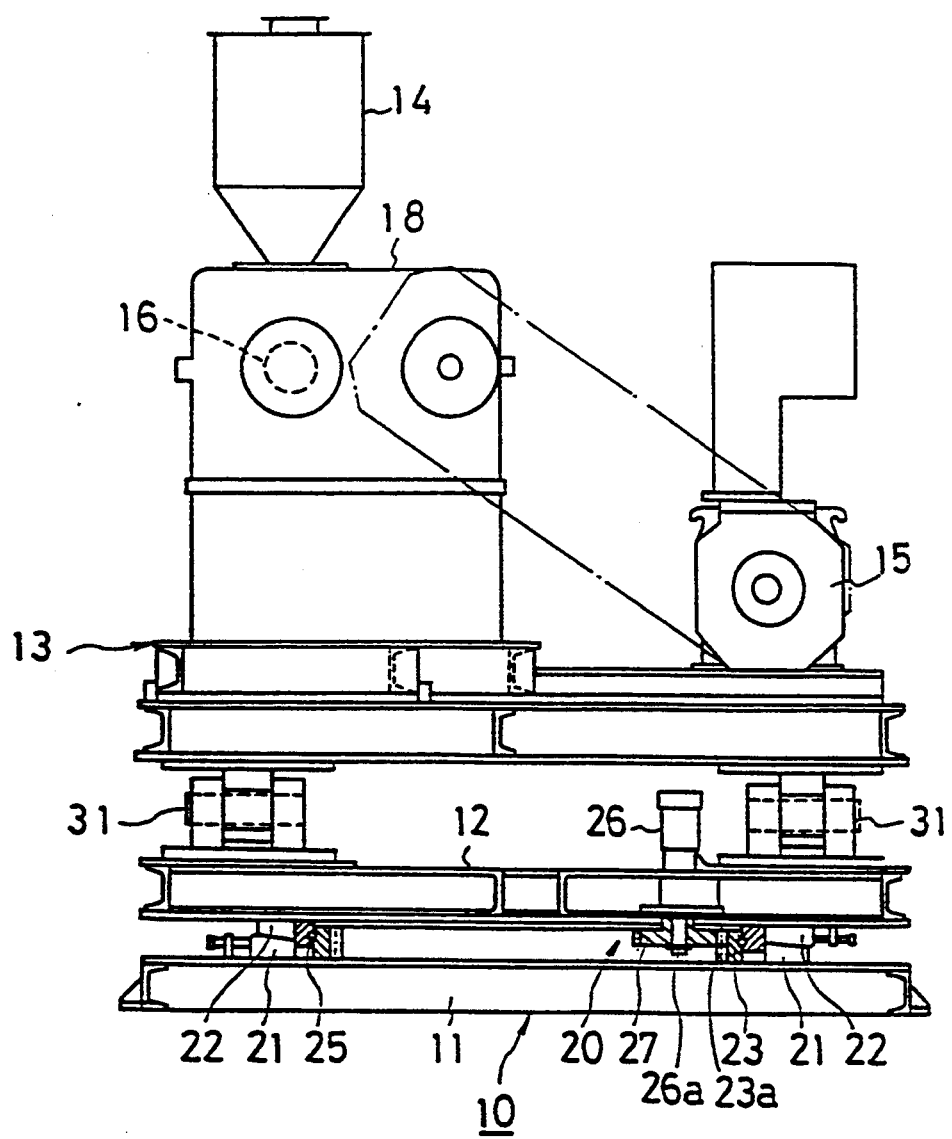
FIG. 4 is a back view of the same extruder.

As shown in FIG. 2 to FIG. 4, the extruder body 13 has at its upper rear side a hopper 14 for throwing pellet-shaped thermoplastic resin (a feed material), and has under this hopper 14 a cylinder 18 which contains a screw 16 rotated by a motor 15 or the like and whose outside is heated by a heater (not shown). The thermoplastic resin heated and melted in the cylinder 18 is simultaneously extruded and fed as three tubular melt parisons 2, 2, 2 through a tubular forcing die head 19 provided at the fore end of said cylinder 18 into each of three cavities of the same shape formed in the pair of said shut-off molds 8, 8' provided vertically below said die head 19. In addition, one, two, or four or more melt parisons 2 may be extruded from the extruder body 13, and the invention is not limited by three melt parisons.

As shown in FIG. 1 to FIG. 4, the turning drive mechanism 20 is composed of guides 21 fixed at four corners of the upper surface of said down base 11, guides 22 fixed at four corners of the under surface of said upper base 12 and provided slidably to each of said guides 21, a motor 26 fixed on supper base 12 a turning wheel bearing (inside bearing) 23 having inside teeth 23a on its inner periphery fixed on the top surface of said down base 11 and a driving gear 27 fixed on shaft 26a of motor 26 meshes with the inside teeth 23a of said inside bearing 23.

As shown in FIG. 2 to FIG. 4, the lifting drive mechanism 30 comprises roughly a pair of hinges 31, 31 provided between the rear part of the upper base 12 and the rear part of the extruder body 13, a pair of shock absorbers 32, 32 made to intervene between the front part of the upper base 12 and the front part of the extruder body 13, a pair of links 34, 34 whose one end is journaled between a pair of brackets 33, 33 standing on the front side of the upper surface of the upper base 12, a link 36 whose one end is journaled on a pair of brackets 35, 35 suspending on the front side of the under surface of the extruder body 13, and an oil-hydraulic cylinder 38 journaled swingably in the vertical direction on a bracket 37 standing on the upper surface of the upper base 12, and pivotally supported by a pin so as to hold the other ends of the pair of said links 34, 34 and the other end of said link 36 in the U-shaped part of the fore end of its rod 38a.

Figure 5:
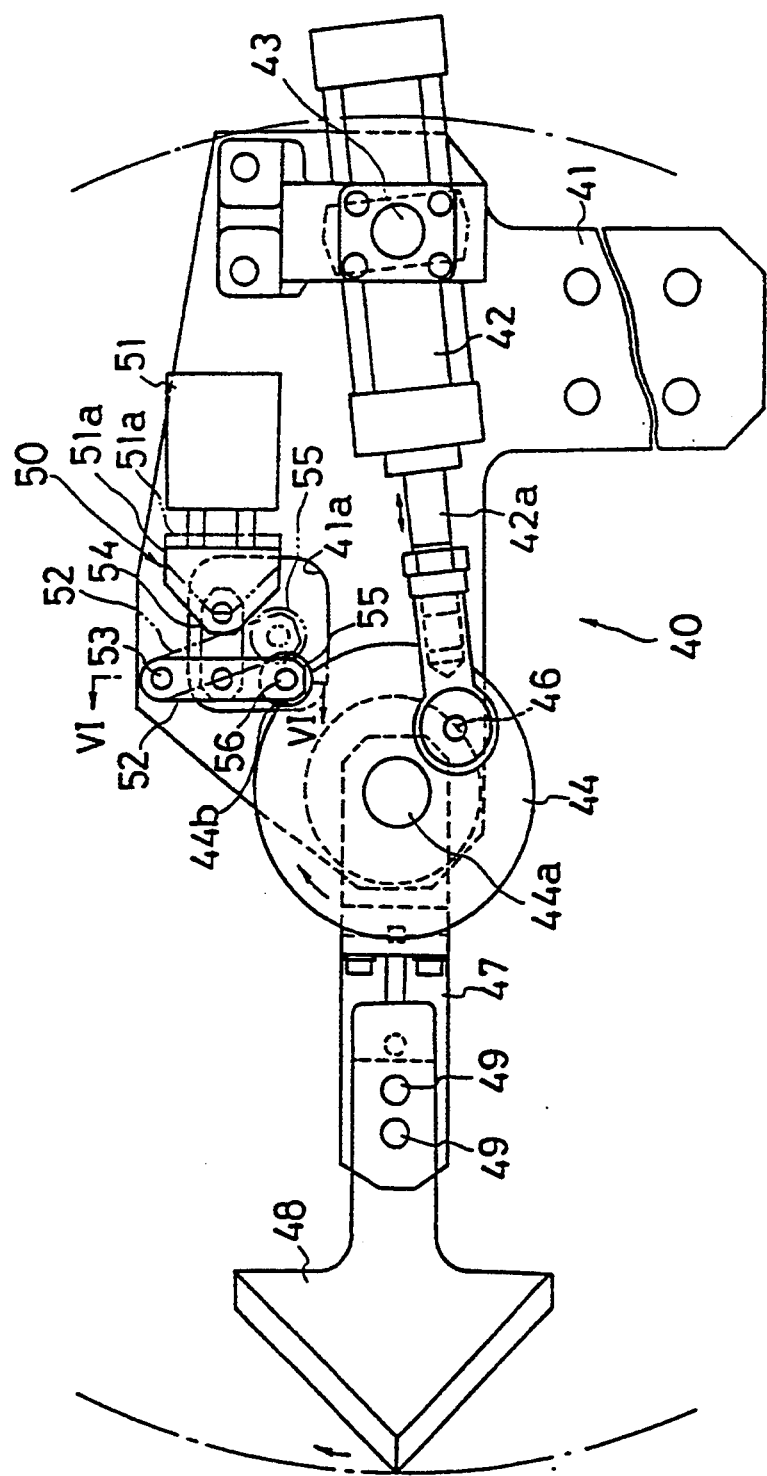
FIG. 5 is a plan view of a parison cutting unit of the same blow molding machine.
Figure 7:
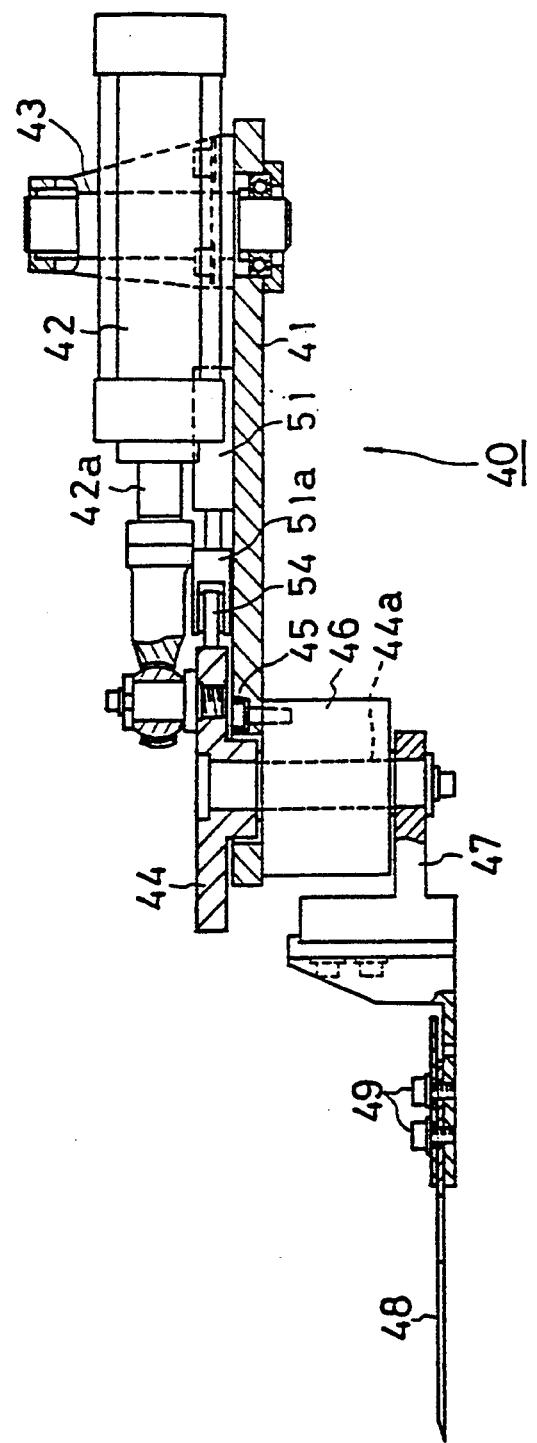
FIG. 7 is a side view of the same parison cutting unit, showing its part in cross-section.

As shown in FIG. 5 and FIG. 7, a parison cutting unit 40 is adapted to cut the three melt parisons 2, 2, 2 fed into the pair of said shut-off molds 8, 8' arranged under said die head 19, at a given length, respectively, so that their upper ends 2a, 2a, 2a are slightly protruded over the top surface of the pair of said shut-off molds 8, 8'. This parison cutting unit 40 comprises a base plate 41 fixed on the extruder body 13 and extending horizontally under the front part of said cylinder 18, an air cylinder (actuator) 42 supported swingably right and left on the base part of said base plate 41 by way of a supporting shaft 43 or the like, a rotary plate 44 which is rotated in one direction (clockwise) by the advancing and retreating reciprocation of the rod 42a of said air cylinder 42, in which the center of its shaft part 44a is inserted on a one way clutch 46 fixed on the under surface of the fore end of said base plate 41 by a bolt 45 and the fore end of said rod 42a is pivotally supported by a pin, an attachment plate 47 fixed at the lower end of the shaft part 44a of said rotary plate 44, a cutter 48 fixed on the upper surface of the front part of said attachment plate 47 by way of a plurality of bolts 49, whose fore end is triangular, and a cutter positioning mechanism 50 provided together with the air cylinder 42 and rotary plate 44 on the base plate 41 to determine the cutting start-up position (the rotation beginning position) of said cutter 48. The said cutter 48 is adapted to rotate in one direction, not reciprocate, thereby cutting the upper end 2a, 2a, 2a of each melt parison 2, 2, 2, and as a result, each melt parison 2, 2, 2 can be cut to a given state, for example at a given length. In addition, the upper end 2a of each melt parison 2 will remained as an upper flash 2a' (a flash on the mouth) on the upper part of a molding 2' after it is blow-molded.

Figure 6:
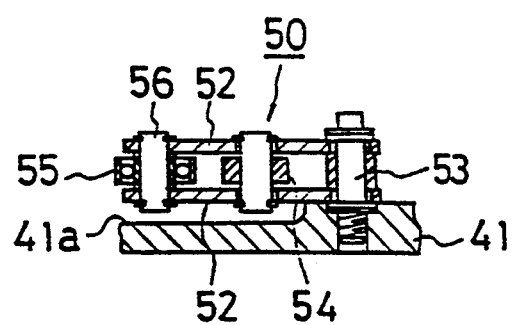
FIG. 6 is a cross-sectional view taken along the line VI—VI in FIG. 5.

As shown in FIG. 5 and FIG. 6, the cutter positioning mechanism 50 comprises a small-sized air cylinder 51 fixed on the base plate 41 so as to lay almost in parallel with the air cylinder 42, a pair of links 52, 52 swingably supported over the concave part 41a of said base plate 41 by way of a supporting shaft 53 on the base plate 41, an intermediate link 54 in which both ends thereof are pivotally supported by a pin on the centers of the pair of said links 52, 52 and the fore end 51a of the rod of said air cylinder 51, respectively, and a roller 55 rotatably supported between the fore ends of the pair of said links 52, 52 by way of a supporting shaft 56 and made to freely contact with or alienate from an arc-shaped notch part 44b formed on the outer periphery of said rotary plate 44, which determines the cutting start-up position (the rotation beginning position) of said cutter 48.

The circumferential edge of the under surface of the turntable 7 rotatably supported on the base 5 by way of the supporting shaft 6 is mounted on a number of bearings 60 erected on the base 5 and the outer periphery of said turntable 7 has an annular driven gear 61 fixed thereon. This driven gear 61 meshes with a pair of idle gears 62, 62 rotatably supported by way of each supporting shaft 63 erected on the base 5. The pair of these idle gears 62, 62 mesh with a driving gear 66 attached on a reduction gear 65 for an AC survomotor 64 on said base 5. Since the pair of said idle gears 62, 62 are made to intervene between the driving gear 66 and the driven gear 61 on the outer circumference of said turntable 7, any backlash between each of said gears can be eliminated, and as a result, the positioning of the turntable 7 at its intermittent rotation or stoppage, can be carried out with high accuracy.

As shown in FIG. 1 and FIG. 8, a U-shaped portal frame 67 is erected from the position of the station B to the position of the station E of the turntable 7 on said base 5 so as to stride over the turntable 7. A molding container 68 for containing moldings 2' taken-out and a chute 69 are erected at the position of the station F of the turntable 7 on the base 5. A flash shape correcting mechanism 70 for correcting the upper end 2a of a melt parison 2 that is not solidified still, protruding upward above the top surface of the pair of said shut-off molds 8, 8' into a flatly standing state, is arranged at the position of the station B of the turntable 7 on the portal frame 67. And, a molding taking-out unit 80 which takes out the moldings 2' by clamping and lifting up the upper flash 2a' of the moldings 2' when the pair of said shut-off molds 8, 8' left after the hollow molding are opened, and then adsorbing the upper flash 2a' of the moldings 2' and clamping the body 2b' thereof, is provided between the upper frame 68a and middle frame 88b of the molding container 88 protruded upward over the turntable 7.

Figure 9:
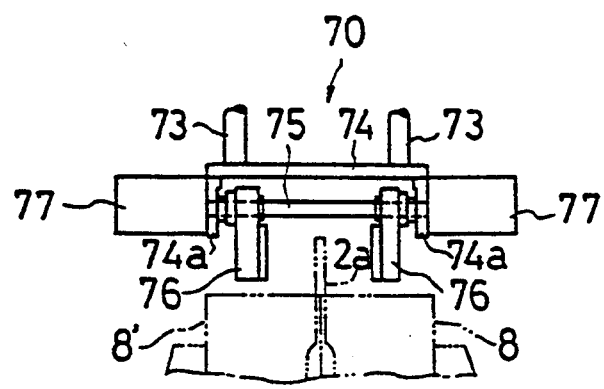
FIG. 9 is a front view of a flash shape correcting mechanism of the same blow molding machine.
Figure 10:
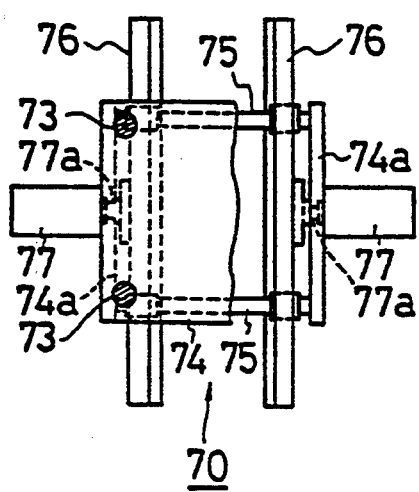
FIG. 10 is a plan view of the same flash shape correcting mechanism.

As shown in FIG. 8 to FIG. 10, the flash shape correcting mechanism 70 comprises four guide bolts 73, . . . whose fore ends are fixed and suspended by nuts 72 on a bracket 71 fixed midway above the pair of said shut-off molds 8, 8' at the station B of the turntable 7 of said portal frame 67, a n-shaped attachment plate 74 attached at the lower ends of guide bolts 73, a pair of clampers 76, 76 which clamp the upper end 2a, 2a, 2a of each melt parison 2, 2, 2 and which penetrate and slide through a pair of guide shafts 75, 75 stretched between both side parts 74a of said attachment plate 74 so as to protrude above the top surface of the pair of said shut-off molds 8, 8', that is not solidified still, so that the same upper end is corrected to a flatly standing state, and a pair of air cylinders 77, 77 attached at the outside centers of both side parts 74a, 74a of said attachment plate 74, in which the fore end of each rod 77a thereof is fixed at the center of each clamper 76 to contact the respective clampers 76, 76 with each other or move them away from each other. In addition, a cooling means may be provided on the pair of said clampers 76, 76 to promote the solidification of the upper end 2a of the melt parison 2.

As shown in FIG. 11, the molding taking-out unit 80 comprises an upper flash clamping and taking-out mechanism 81 arranged on the upper frame 68a of said molding container 68 to clamp and lift up the upper flash 2a' of each molding 2' when the pair of said shut-off molds 8, 8' left after the blow molding are opened, and an adsorbing, clamping and conveying mechanism 90 arranged on the middle frame 68b of said molding container 68 to adsorb the upper flash 2a' of each molding 2' caused to come up by means of the upper flash clamping and taking-out mechanism 81 and to clamp and rotate its body 2b' at 180° so that the molding 2' is brought into the molding container 68.

As shown in FIG. 11 to FIG. 14, the upper flash clamping and taking-out mechanism 81 is composed of an air cylinder 82 erected at the fore end of the upper frame 68a of said molding container 68, an almost U-shaped attachment plate 83 fixed at the fore end of the rod 82a of said air cylinder 82, which is moved in the vertical direction with the elongation and contraction of said rod 82a, a pair of chucks 85, 86 which penetrate and slide along a pair of guide shafts 84, 84 stretched between both side parts 83a, 83b of said attachment plate 83 to clamp the upper flash 2a' of the molding 2' from the inside of the pair of said shut-off molds 8, 8' when opened, an air cylinder 87 attached at the center of the inside surface of one side part 83a of said attachment plate 83, which the fore end of its rod 87a is fixed at the center of one chuck 86, and a pair of air cylinders 88, 88 attached on both the sides of outside surface of one side part 83a of said attachment plate 83, in which the fore ends of their rods 88a are fixed on both sides of the other chuck 85, respectively to contact three chuck pieces 89 of the other chuck 85 and the one chuck 86 with each other or move them away from each other. Thus, the upper end of the upper flash 2a' of the molding 2' is clamped by the three chuck pieces 89 of said one chuck 85 and the other chuck 86, with the advancing movement of the rods 87a, 88a of the respective air cylinders 87, 88, and the molding 2' is taken out of the pair of said shut-off molds 8, 8' when opened, with the retreating movement of the rod 82a of the air cylinder 82, and lifted up to a given position under the upper frame 68a of said molding container 68. In addition, a cooling means may be provided on the chucks 85, 86.

Figure 15:
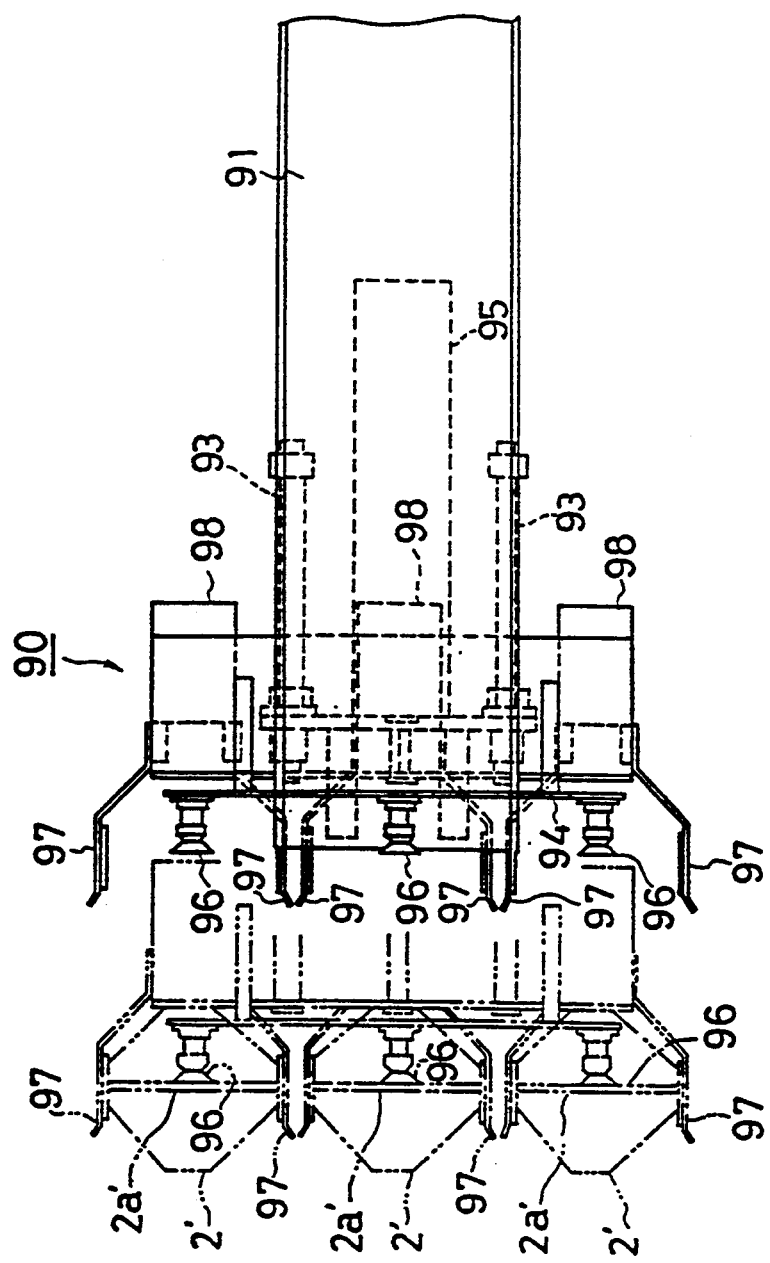
FIG. 15 is a plan view of an adsorbing, clamping and conveying mechanism of the same molding taking-out unit.
Figure 16:
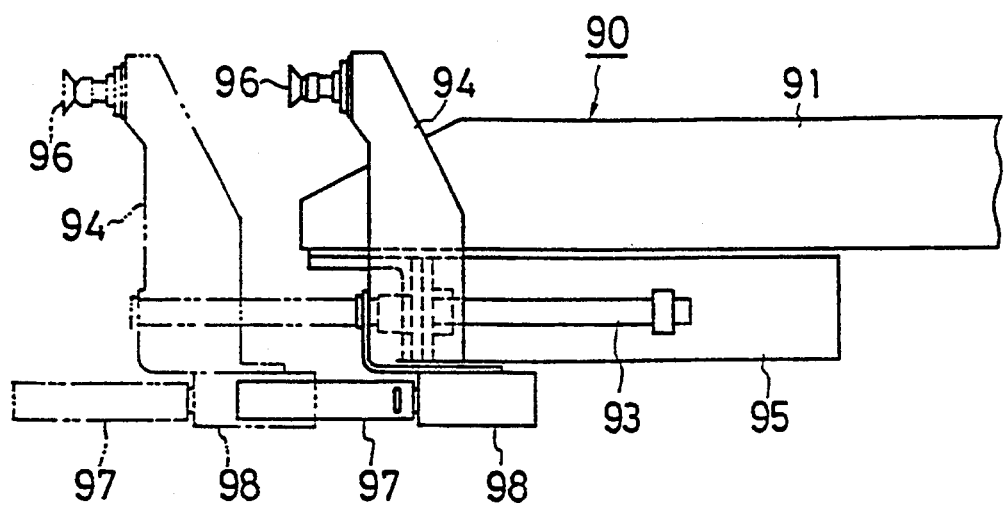
FIG. 16 is a side view of the same adsorbing, clamping and conveying mechanism.
Figure 17:
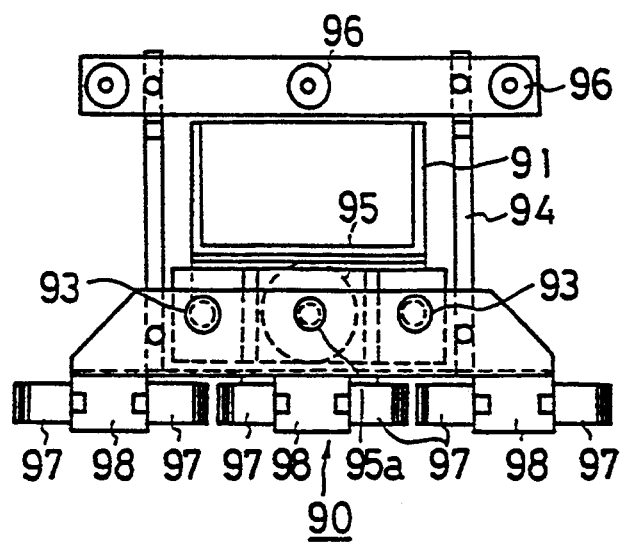
FIG. 17 is a front view of the same adsorbing, clamping and conveying mechanism.

As shown in FIG. 11 and in FIG. 15 to FIG. 17, the adsorbing, clamping and conveying mechanism 90 is composed of a pair of arms 91, 91 which are rotated at every 180° by a motor 92 erected on the middle frame 68b of the molding container 68, a slide frame 94 slidably provided in the longitudinal direction along a pair of guide shafts 93, 93 provided respectively on both side parts of the fore end of each arm 91, an air cylinder 95 in which the fore end of its rod 95a is fixed on said slide frame 94, and which is reciprocatingly moved in the longitudinal direction on the slide frame 94 with the advancing and retreating movements of said rod 95a, three adsorbing pads 96 attached on the front surface of the upper part of said slide frame 94 so as to be spaced equidistantly from one another, which vacuum adsorb the upper flash 2a' of the molding 2', and three sets of clamping pieces 97, 97, each set consisting of a pair of them, attached on the fore surface side of the lower part of said slide frame 94 so as to be spaced equidistantly from one another, which clamp the body 2b' of the molding 2' or release the clamping by means of each air cylinder 98. In addition, the reference numeral 99 in FIG. 11 represents an access switch, wherein by means of each of these access switches 99, the rotating positions of the pair of said arms 91, 91 are respectively determined so that the respective adsorbing pads 96 and the pair of said clamping pieces 97, 97 provided respectively on each fore end of the pair of said arms 91, 91 come to a position above the pair of said shut-off molds 8, 8' opened and above the chute 69 of said molding container 68, respectively.

Figure 18:
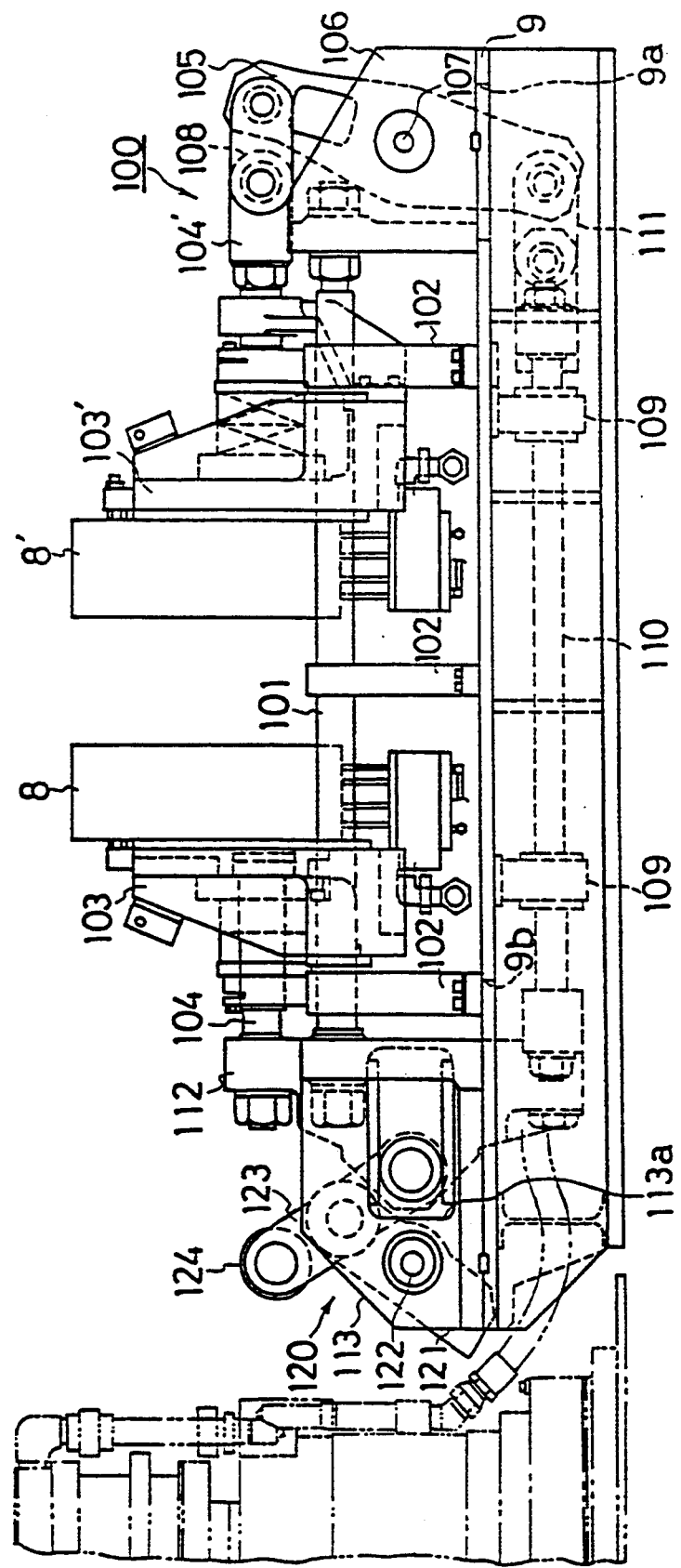
FIG. 18 is an enlarged side view of a mold clamping unit of the same blow molding machine.

Six sets of the shut-off molds 8, 8', each set consisting of the pair of them, arranged every 60° on said turntable 7 by way of six bed plates 9 are made to be freely opened or shut by a mold clamping unit 100 shown in FIG. 8 and FIG. 18. This mold clamping unit 100 comprises a pair of guide shafts 101, 101 fixed so as to be parallel in the horizontal direction by way of three supporting blocks 102 equidistantly standing at the center of said bed plate 9, a pair of movable plates 103, 103' slidably provided on the pair of said guide shafts 101, 101, in which said molds 8, 8' are fixed on their opposite surfaces, respectively, a pair of clamp rods 104, 104' fixed at their one end on the back surface side of each movable plate 103, 103', which contact the respective molds 8, 8' with each other or move them away from each other, a swing lever 105 swingably supported on a bracket 106 erected at one end (the outside) of said bed plate 9 by way of a pivot 107 positioned below the height of the respective guide shafts 101, 101, in which the other end of one clamp rods 104' is pivotally supported by a pin at its upper end by way of an intermediate link 108, and its lower end part is protruded below the top surface of said bed plate 9 through the opening 9a thereof, a slide rod 110 slidably supported under the bed plate 9 by way of a pair of blocks 109, 109, in which one end thereof is pivotally supported by a pin of an intermediate link 111 on the lower end of said swing lever 105 and in which the distance between link 111 and pivot 107 is the distance between the other end of an intermediate link 108 pivotally supported by a pin on the other end of said clamp rod 104' and the pivot 107, a connection plate 112 which connects the other ends of said slide rod 110 and other clamp rod 104 through the opening 9b of said bed plate 9, respectively, and which slides along a bracket 113 standing at the other end (the inside) of said bed plate 9, said connection plate 112 being made movable reciprocatingly by a pair of oil-hydraulic cylinders (actuators) 114, 115 suspended at the positions of the portal frame 67 opposite to the stations A, F, and a toggle mechanism 120 which causes the connection plate 112 to move forward by the one oil-hydraulic cylinder 114 so that the pair of said molds 8, 8' are shut and causes the connection plate 112 to move backward by the other oil-hydraulic cylinder 115 so that they are opened, and maintains their states.

This toggle mechanism 120 is composed of a first link 121 turnably supported in the vertical direction on a bracket 113 standing on the other end (inside) of the bed plate 9 by way of a supporting shaft 122, in which one end thereof is pressed by the other oil-hydraulic cylinder 115 so that the other end thereof is pivoted upwardly and a second link 123 in which the middle part thereof is pivotally supported by a pin on the other end of said first link 121, the other end thereof is pivotally supported by a pin on said connection plate 112 and slid through the opening 113a of said bracket 113 to cause the connection plate 112 to move backward when the other end of the first link 121 is pivoted upwardly, and in which a roller 124 rotatably supported at one end is pressed by the one oil-hydraulic cylinder 114 to cause the connection plate 112 to move forward.

Then, a procedure of blow-molding melt parisons 2 in the rotary blow molding machine according to the aforesaid embodiment will be described in which each pair of shut-off molds 8, 8' are intermittently rotated from the station A to the station F.

At first, a pair of shut-off molds 8, 8' opened at the station F, as shown in FIG. 18, from which each molding 2' has been taken out by the molding taking-out unit 80, rotate to the station A. When the pair of said shut-off molds 8, 8' are then stopped at the station A by stopping the AC servomotor 64, the pair of said shut-off molds 8, 8' are shut by the mold clamping unit 100 so as to hold therebetween each melt parison 2, 2, 2 already extruded at a given length. Namely, the roller 124 of the second link 123 of said mold clamping unit 100 is pressed down by the oil-hydraulic cylinder 114 so that the connection plate 112 is caused to move (move forward) toward the outside (the radial outside of the turntable 7) on the bed plate 9. With the forward movement of the connection plate 112, one clamp rod 104 pushes one mold 8 in the closing direction and the other clamp rod 104' is moved in the opposite direction to the one clamp rod 104 by way of the slide rod 110, intermediate link 111, swing lever 105 and intermediate link 108 to push the other mold 8' in the closing direction. Thus, the pair of said shut-off molds 8, 8' are instantly shut so as to hold three melt parisons 2, 2, 2 therebetween. Almost simultaneously with the mold-clamping of the pair of the shut-off molds 8, 8', the cutter 48 is rotated at a high speed in the one direction (clockwise) of the arrow in FIG. 5, with the advancing and retreating movements of the rod 42a of the air cylinder 42 of the parison cutting unit 40 so that the three melt parisons 2, 2, 2 are instantaneously cut, respectively. Since the cutter 48 is rotated in the one direction by means of the one way clutch 46 to cut each melt parison 2, 2, 2, these melt parisons 2, 2, 2 can be respectively cut at a given state, for instance at a given length at all times. Thus, the monitoring of the cut length of each melt parison 2, 2, 2 and the feedback control thereof based on data processing can be easily carried out. Since the cutting start-up position of the cutter 48 is positioned always at a position shown by a solid line in FIG. 5 by means of the cutter positioning mechanism 58, there is furthermore promoted an effect of cutting each melt parison 2, 2, 2 at a given length at all times.

Almost simultaneously with the cutting of each melt parison 2, 2, 2, as shown in FIG. 2, the head die 19 side of the extruder body 13 of said extruder 10 is rotated upward around a pair of hinges 31, 31 so as to be lifted up by the lifting drive mechanism 30. When the pair of the shut-off molds 8, 8' is rotated to the next station B, accordingly, there is no interference between the pair of said shut-off molds 8, 8' and each melt parison 2, 2, 2 which is being extruded from the die head 19. When the pair of the shut-off molds 8, 8' and each melt parison 2, 2, 2 under extrusion are rotated to the position where they do not interfere with each other, as shown in FIG. 2, the die head 19 side of the extruder body 13 of the extruder 10 is rotated downward around the pair of said hinges 31, 31 so as to be lifted down with the retreating movement of the rod 38a of the oil-hydraulic cylinder 38 of the lifting drive mechanism 30, wherein three melt parisons 2, 2, 2 are continuously extruded in succession from the die head 19 so that each melt parison 2, 2, 2 is extruded at a given length when a next pair of shut-off molds 8, 8' are stopped at the station A.

By driving the AC servomotor 64 to repeat the intermittent rotation and stoppage of the pair of said shut-off molds 8, 8' in turn every 60° from the station B to the station E as they are shut, compressed air is blown into each melt parison 2 held between the pair of said shut-off molds 8, 8' from a blow needle (not shown) contained in the pair of the shut-off molds 8, 8' to blow-mold the melt parison 2 to a given hollow shape, and after the molding, the molding 2' is cooled in the pair of the shut-off molds 8, 8'.

In the pair of these shut-off molds 8, 8', a compressed air blowing device is a blow needle, not a blow pin, and as a result, it is impossible to take out the molding 2' by a pin. In the station B, the upper end 2a, 2a, 2a of each melt parison 2, 2, 2 slightly protruded from the top surface of the pair of said shut-off molds 8, 8', that is not solidified still, is accordingly clamped by the pair of said clampers 76, 76 of the flash shape correcting mechanism 70, so that the upper end 2a, 2a, 2a of each melt parison 2, 2, 2 is corrected to a flatly standing state, thereby facilitating the taking-out of the molding 2' from the pair of said shut-off molds 8, 8' by a molding taking-out unit 80 mentioned below.

In each section from the station A to the station F, the turntable 7 which is large in diameter (for example 2,700 mm) and heavy in weight (about 10 tons) is intermittently rotated (for instance, it is rotatively moved for 1.6 sec. in each section of 60°, and stopped here for 0.9 sec.) at a high speed (for example 2.5 sec.) by a turntable driving unit comprising the AC survomotor 64, driving gear 66, a pair of idle gears 62, 62 and a driven gear 61, whereby the pair of said shut-off molds 8, 8' are intermittently rotated in turn. Since the pair of said idle gears 62, 62 are made to intervene between the annular driven gear 61 fixed on the outer circumference of said turntable 7 and the driving gear 66 for transmitting the rotation of the AC servomotor 64, it is possible to eliminate backlash between the respective gears. Thus, the positioning of the turn table 7 in its rotation or stoppage can be carried out with high accuracy.

When the pair of said shut-off molds 8, 8' come to the station F, the pair of chucks 85, 86 of the upper flash clamping and taking-out mechanism 81 of said molding taking-out unit 80 have been already lifted down. Thus, the upper flash 2a' of the molding 2' protruded from the top surface of the pair of said shut-off molds 8, 8' and corrected in the flatly standing state by the flash shape correcting mechanism 70 is clamped by each chuck piece 89 of said chuck 85 and the chuck 86. Almost simultaneously with this clamping, said mold clamping unit 100 is actuated by the oil-hydraulic cylinder 115 to open the pair of said shut-off molds 8, 8'. And then, the pair of said chucks 85, 86 are lifted up to the adsorbing, clamping and conveying mechanism 90, with the retreating movement of the rod 82a of the air cylinder 82 of the upper flash clamping and taking-out mechanism 81. After the molding 2' has been lifted up by the upper flash clamping and taking-out mechanism 81, each adsorbing pad 96 provided on one arm 91 of the adsorbing, clamping and conveying mechanism 90 then vacuum-adsorbs positively the portion of the upper flash 2a' of said molding 2' just under the pair of said chucks 85, 86, and holds positively the body 2b' thereof by each pair of the clamping pieces 97, 97 in such a manner that the molding 2' is not swinging, as shown in FIG. 11. And then, said arm 91 is rotated at 180° by the motor 92 to release the adsorbing and clamping state, whereby the finished moldings 2' are contained into the molding container 68, respectively.

The mold opening of the pair of said shut-off molds 8, 8' by the mold clamping unit 100 will be carried out by moving (backward) the connection plate 112 in the reverse direction to said mold clamping. Since the pivot 107 of the swing lever 105 of this mold clamping unit 100 is positioned below the height of the pair of said guide shafts 101, 101, and the distance between this pivot 107 and the pin pivotally supporting point of the intermediate link 108 on the other end of the clamp rod 104' and the distance between the pivot 107 and the pin pivotally supporting point of the intermediate link 111 of the slide rod 110 are made equidistant and said pivot 107 is provided midway between the position of the pair of said guide shafts 101 and the position of the top surface of the bed plate 9, the mold clamping force of said mold clamping unit 100 can be uniformly divided by the pair of said guide shafts 101, 101 and the bedplate 9, without any unreasonable load applied on the bed plate 9 or the like. In addition, the opened or shut state of the pair of said shut-off molds 8, 8' can be positively retained by means of the toggle mechanism 120 which is composed of the first link 121, the second link 123 and the like and simple in structure.

When the screw 16 of the extruder 10 is drawn out for cleaning after completion of the blow molding using the rotary blow molding machine 1, the extruder body 13 of the extruder 10 can be turned at a given angle with respect to the turntable 7 by the turning drive mechanism 20, as shown by the double dotted line in FIG. 1. As a result, the cleaning of the screw 16 or the like can be facilitated, with no interference of the extruder body 13 with the mold clamping unit 100. In addition, the installation space for the rotary blow molding machine 1 can be saved, because the extruder body 13 is made to be of the turning type.

Although the extruder 18 of the rotary blow molding machine 1 is provided so as to be movable up and down around the pair of said hinges 31, 31 by the lifting drive mechanism 30, according to the aforementioned embodiment, the extruder 10 is not limited to this type. Such a modification as an extruder 10' of another embodiment shown in FIG. 19, may be adopted in which the position of a pair of hinges 31', 31' is made to be almost the same height as that of the die head 19 (on the same horizontal plane) by way of a reversed V-shaped frame 3. By this modification, the vibration of the die head 19 or the displacement of a parison 2 from the center can be positively solved. In addition, the other constitution is the same as the aforementioned embodiment and its description in detail is therefore omitted by using the same designations.

Next, the blow molding method using the abovementioned blow molding machine 1 will be described in detail.

The blow molding machine 1 comprises an extruder 10 for extruding and hanging down a parison 2, a pre-sealing device 200 for presealing one end part of said parison 2, a preblowing device 201 contained in a die head 19 of said extruder 10 so as to preblow compressed air into the presealed parison 2, a pair of molds 8, 8' for holding the parison 2 therebetween to close both end parts of said parison 2, and a blowing device 202 contained in the mold 8 so as to inject compressed air into the parison 2 enclosed in the molds 8, 8' until the parison 2 accords with the cavity of the molds 8, 8'.

In the blow molding machine 1, the parison 2 extruded from the extruder 10 is hung down, one end part of said parison 2 is held under pressure so as to be presealed by the presealing device 200, the compressed air is preblown into the parison 2 by the preblowing device 201, and then said parison 2 is held between the pair of said molds 8, 8' to close both the end parts of the parison 2, the compressed air is injected into the closed parison 2 until said parison 2 accords with the cavity of the molds 8, 8', thereby blow-molding a molding 2', and the formed molding 2' is cooled in the molds 8, 8'. In FIG. 25B, the reference numeral 230 represents a cooling water passage provided in the molds 8, 8'.

In the blow molding machine 1, however, the presealing device 200 is provided on the lower end part of the pair of said molds 8, 8', as shown in FIGS. 20A and 20B. This presealing device 200 is composed so that a pair of presealing plates 203, 203' are arranged protrudedly in front of the mating surfaces of the pair of said molds 8, 8'and compression springs 204, 204' are provided which support elastically these presealing plates 203, 203' from their back sides. Accordingly, the presealing device 200 serves to hold under pressure one end part of the parison 2 by the presealing plates 203, 203' in the intermediate course of shutting the molds 8, 8' so that it is presealed. In the blow molding machine 1, on the other hand, a compressed air discharge port 205 of the preblowing device 201 is opened at the center of the die head 19 of the extruder 10, wherein compressed air is always discharged from this compressed air discharge port 205. When one end part of the parison 2 has been presealed by the presealing device 200, as mentioned above, the compressed air supplied by the preblowing device 201 expands the whole of the parison 2 so that a predetermined space is formed between two parison skins thereof, and in the following step, a blow needle 210 of the blowing device 202 punctures the two parison skins in the cavity of the molds 8, 8', whereby it is prevented to make impossible the blow molding of the parison 2.

In the blow molding machine 1, namely, the presealing of the parison 2 is carried out in the lower part of the molds 8, 8', this is at a position that is most apart from the extruder 10. When the parison 2 is presealed, accordingly, it does not undergo a strong bending action just under the dies 19A and core 19B in the die head 19 of the extruder 10, with no formation of any ring mark flaws. It is therefore possible to make smaller a lower flash to be removed on the lower end part of the parison 2, and to improve the yield.

In the blow molding machine 1, the parison 2 has been extruded at a length corresponding to the whole length of a molding at the stage of presealing the parison 2, and the parison 2 is uniformly expanded in whole by preblowing. The preblowing can be therefore carried out through the whole course of extrusion of the parison 2, wherein the preblowing before the presealing serves merely to perforate and release the parison 2, and the preblowing after the presealing serves to expand the whole of the parison 2 uniformly. Namely, it is possible to simplify the control of the preblowing, because there is no need of monitoring the timing of starting the preblowing.

Figure 21A:
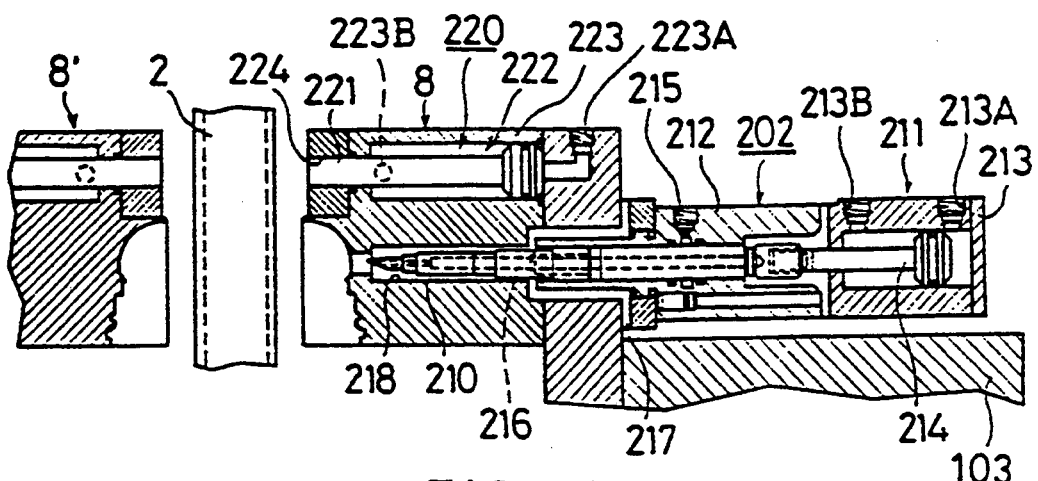
FIG. 21A is a cross-sectional view of the molds containing a blowing device and an ejector device, with the blow needle in a cavity retreating position, prior to an injection operation.
Figure 21B:
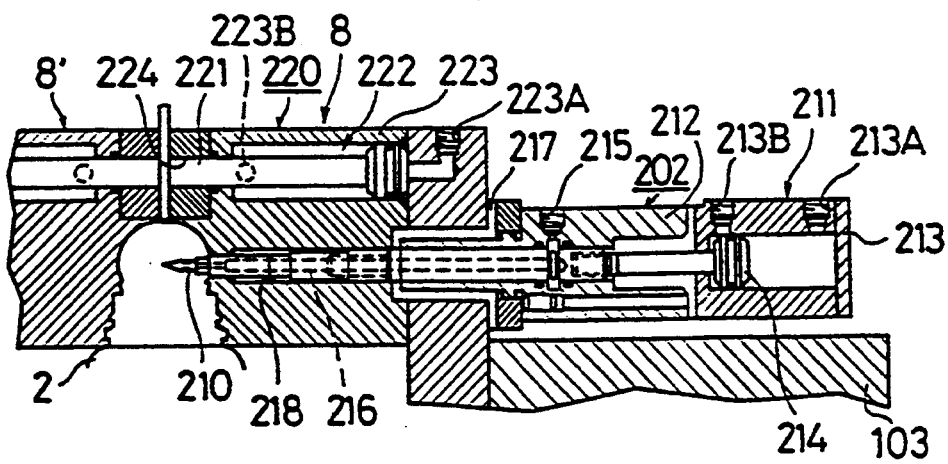
FIG. 21B is a cross-sectional view of the molds containing a blowing device and an ejector device, with the blow needle in a cavity invading position, during an injection operation.
Figure 21C:
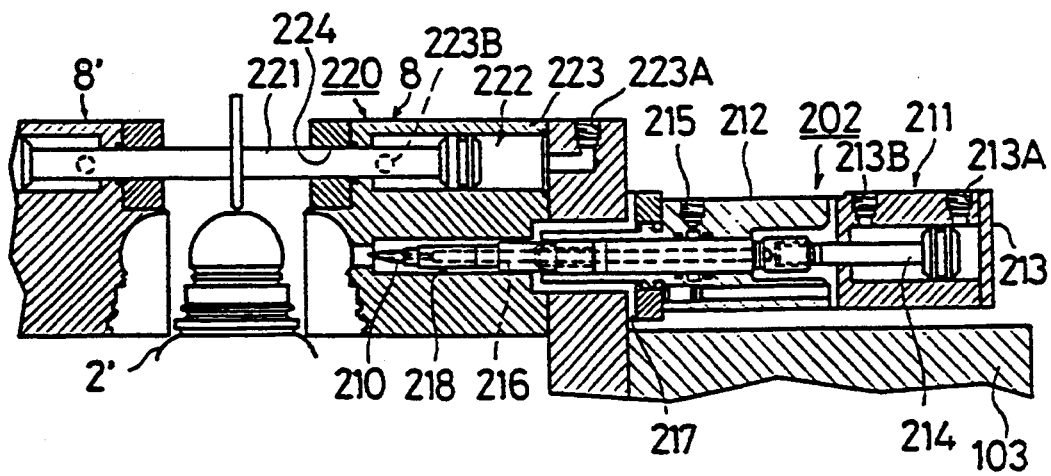
FIG. 21C is a cross-sectional view of the molds containing a blowing device and an ejector device, with the blow needle in a cavity retreating position, after an injection operation.

In the blow molding machine 1, furthermore, as shown in FIGS. 21A, 21B, and 21C the blow needle 210 and blow needle driving part 211 of the blowing device 202 are contained in the mold 8 attached on a movable plate 103 that is a mold fixture plate. Namely, a guide block 212 is integrated on the back side part of the mold 8 opposite to each cavity thereof, and the blow needle driving part 211 is integrated in this guide block 212. The blow needle driving part 211 comprises an air cylinder 213 and a piston rod 214, and the base end part of the blow needle 210 is connected with this piston rod 214. The blow needle driving part 211 serves to selectively switching over the supply of compressed air to a needle push-out port 213A and needle return port 213B of the air cylinder 213, whereby the blow needle 210 is switchably set at either of the cavity invading position (see: FIG. 21(B)) and the cavity retreating position (see: FIGS. 21(A) and (C)). When the blow needle 210 is set at the cavity invading position, an air intake port 215 provided in the guide block 212 is communicated to an air passage 216 perforated at the central part of the blow needle 210. And, when the blow needle 210 is set at the cavity retreating position, an air relief port 217 provided in the guide block 212 is communicated to the space within the cavity through a needle guide hole 218 provided in the mold 8.

Accordingly in the blow molding machine 1, (1) when the pair of said molds 8, 8' are opened and the parison 2 is inserted between the mating surfaces of the molds 8, 8', the blow needle driving part 211 sets the blow needle 210 at the cavity retreating position, (2) when the pair of the molds 8, 8' are shut, the blow needle driving part 211 sets the blow needle 210 at the cavity invading position, wherein the fore end of the blow needle 210 punctures one parison skin of the parison 2 which is being preblown as mentioned above so as to inject the compressed air fed from the air intake port 215 into the parison 2. The injection of the compressed air by the blow needle 210 will be continued until the parison 2 is shaped so as to accord with the cavity of the mold 8, 8' and further cooled. And, (3) just before the pair of said molds 8, 8' are opened, the blow needle driving part 211 sets the blow needle 210 at the cavity retreating position, wherein high pressure air in the molding 2' is released from the air relief port 217 to the atmosphere through the needle guide hole 218 of the mold 8 from the needle-punctured hole of the parison 2, thereby preventing the high pressure air in the molding 2' from deforming the same molding 2' when the molds are opened.

In the blow molding machine 1, as shown in FIGS. 21A, 21B and 21C, the molds 8, 8' contain an ejector pin 221 and ejector pin driving part 222 of an ejector device 220. Namely, an air cylinder 223 of the ejector pin driving part 222 is contained in both the upper and lower end parts of the molds 8, 8', and a piston rod of this air cylinder 223 constitutes the ejector pin 221. The ejector pin driving part 222 serves to selectively switch over the supply of the compressed air to the pin push-out port 223A and pin return port 223B of the air cylinder 223, whereby the ejector pin 221 is switchably set at either of the standing-by position where it is caused to fall in the upper and lower shut surfaces of the molds 8, 8' (see: FIGS. 21(A) and (B)) and the working position where it is protruded out of the upper and lower shut surfaces of the molds 8, 8' (see: FIG. 21(C)). In addition, the reference numeral 224 represents a pin guide hole provided on the molds 8, 8'.

By virtue of this constitution, in the blow molding machine 1, the ejector pin driving part 225 protrudes the ejector pin 221 from the upper and lower shut surfaces of the molds 8, 8', as shown in FIG. 21(C), when the molding 2' is taken out of the pair of the opened molds 8, 8', so that the molding 2' can be taken out of the molds 8, 8' by holding the upper flash of the molding 2' by a pair of ejector pins 221 provided on the upper end side of the molds 8, 8' and also holding the lower flash of the molding 2' by a pair of ejector pins 221 provided on the lower end side of the molds 8, 8'.

Namely, in the blow molding machine 1, since the blow needle 210 and blow needle driving part 211 of the blowing device 202 or the ejector pin 221 and ejector pin driving part 222 of the ejector device 220 are contained in the molds 8, 8', there is no need of a setting work which comprises inserting the blow needle 210 and ejector pin 221 into the needle guide hole 218 and pin guide hole 224 in the molds 8, 8', and attaching or detaching the blow needle 210 and ejector pin 221 on or from their driving parts 211, 222, when the molds 8, 8' are attached to or detached from the movable plates 103, 103' which are of exchanging the mold fixture plates, so that the workability of the molds 8, 8' can be made satisfactory.

The blow needle 210 and ejector pin 221 are previously inserted in the needle guide hole 218 and pin guide hole 224 in the molds 8, 8', and they are previously integrated with their driving parts in the molds 8, 8'. Accordingly, there is no fear of accompanying any error in assemblying position of the blow needle 210 and ejector pin 221 with the needle guide hole 218 and pin guide hole 224, and any mechanical looseness or error in the assemblying position in the portions where the blow needle 210, ejector pin 221 and their driving parts 211, 222 are attached or detached, so that the smooth motion the blow needle 210 and ejector pin 221 can be ensured.

Nextly, a structure of connecting pairs of pipe lines with each other under the state that the molds 8, 8' are attached to the movable plates 103, 103' in the blow molding machine 1, will be described. For these pairs of pipe lines, namely, there are included a pair of a cooling water supply pipe line 231 provided on the movable plates 103, 103' which are the mold fixture plates and a cooling water supply pipe line 232 provided in the molds 8, 8', a pair of a cooling water discharge pipe line 233 provided in the movable plates 103, 103' and a cooling water discharge pipe line 234 provided in the molds 8, 8', a pair of a blow cylinder air supply pipe lines 235 provided in the movable plate 103 and a blow cylinder air supply pipe line 236 provided in the mold 8, a pair of a blow cylinder air discharge pipe lines 237 provided in the movable plate 103 and a blow cylinder air discharge pipe line 238 provided in the mold 8, a pair of a blow air supply pipe lines 239 provided in the movable plate 103 and a blow air supply pipe line 240 provided in the mold 8, a pair of an ejector cylinder air supply pipe lines 241 provided in the movable plates 103, 103' and an ejector cylinder air supply pipe line 242 provided in the molds 8, 8', and a pair of an ejector cylinder air discharge pipe line 243 provided in the movable plates 103, 103' and an ejector cylinder air discharge pipe line 244 provided in the molds 8, 8'.

At first, referring to the cooling water supply pipe lines 231, 232 and cooling water discharge pipe lines 233, 234, as shown in FIG. 24 to FIG. 26B, the connection ends of the pipe lines 231, 233 on the side of the movable plates 103, 103' are made to be male connecting pipes 231A, 233A which are planted in these movable plates 103, 103' and the connection ends of the pipe lines 232, 234 on the side of the molds 8, 8' are made to be hole-shaped female connecting parts 232A, 234A, whereby the male connecting pipes 231A, 233A are made insertable closely in the female connecting parts 232A, 234A by way of an O-ring 245 provided thereon. In addition, there may be provided only one O-ring, or also three or more O-rings.

Figure 26A:
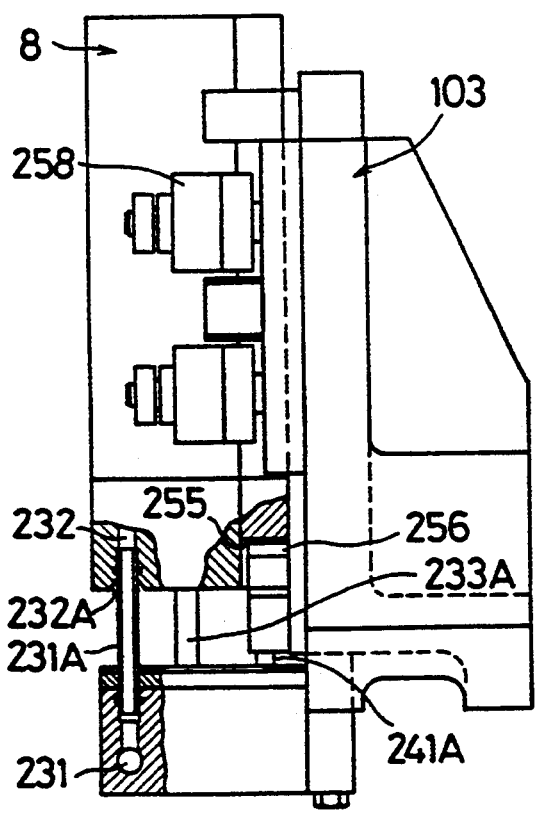
FIG. 26A is a schematic plan view, partly in section, showing a mold pipe line connecting structure.
Figure 26B:
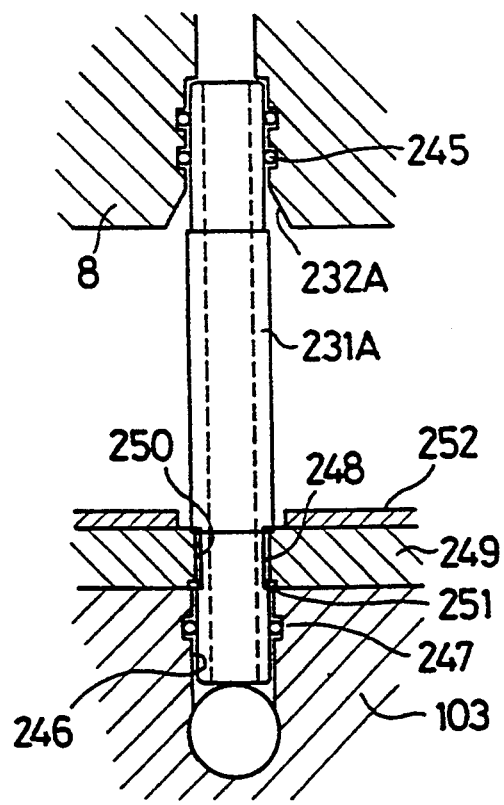
FIG. 26B is an enlarged schematic plan view, partly in section, of a portion of the mold pipe line connection structure of FIG. 26A.

As shown in FIG. 26(B), the planting structure of the male connecting pipe 231A (similarly to the male connecting pipe 233A) in the movable plates 103, 103' is such that the base end part of the male connecting pipe 231A is loosely inserted in a planting hole 246 provided in the movable plates 103, 103', and inserted closely in an O-ring 247 provided on the planting hole 246, and further the small-diametered part 248 provided on the male connecting pipe 231A is flexibly fixed and supported in a supporting hole 250 of an elastic plate 249 such as a rubber plate provided on the movable plates 103, 103'. There may be provided two or more O-rings 247. In addition, the reference numeral 251 represents a snap ring inserted in the small-diametered part 248, and 252 represents a presser plate for pressing and retaining the elastic plate 249 fixed on the movable plates 103, 103' to the same movable plates 103, 103' by a bolt (not shown).

Nextly, referring to the blow cylinder air supply pipe lines 235, 236 and blow cylinder air discharge pipe lines 237, 238, as shown in FIG. 22, FIG. 24 and FIGS. 25A–25C, the connection ends of the pipe lines 235, 237 on the side of the movable plate 103 are made to be male connecting pipes 235A, 237A which are planted in the movable plate 103 and the connection ends of the pipe lines 236, 238 on the side of the mold 8 are made to be hole-shaped female connecting parts 236A, 238A, whereby the male connecting pipes 235A, 237A are made insertable closely in the female connecting parts 236A, 238A by way of an O-ring (not shown) provided thereon. In addition, the planting structure of the male connecting pipes 235A, 237A in the movable plate 103 is made flexible similarly to that of the male connecting pipe 231A shown in FIG. 26(B).

Figure 22:
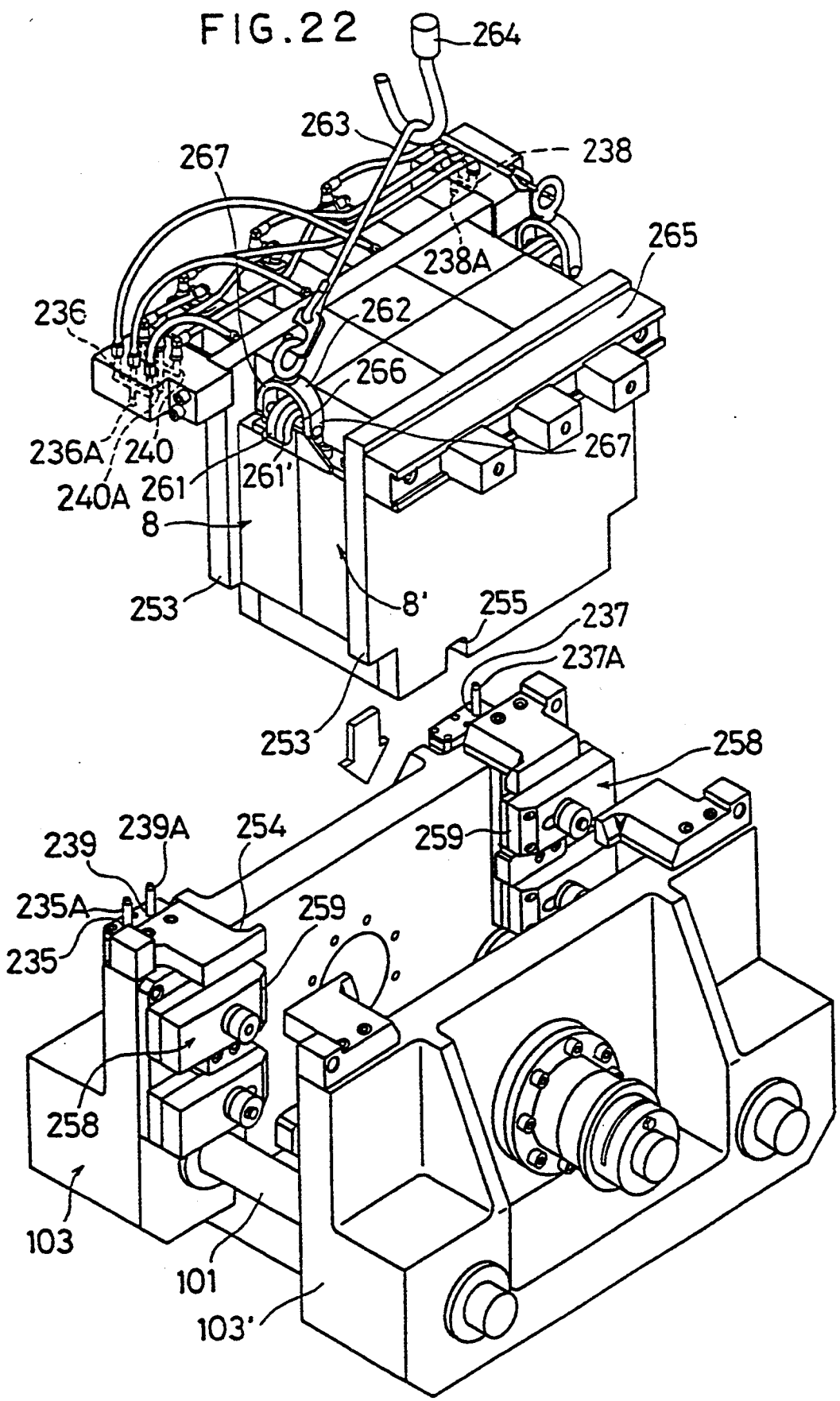
FIG. 22 is a perspective view showing the course of fixing the molds to a mold fixture plate.

Referring to the blowing blow air supply pipe lines 239, 240, as shown in FIG. 22, FIG. 24 and FIG. 25, the connection end of the pipe line 239 on the side of the movable plate 103 is made to be a male connecting pipe 239A which is planted in the movable plate 103 and the connection end of the pipe line 240 on the side of the mold 8 is made to be a hole-shaped female connecting part 240A, whereby the male connecting pipe 239A is made insertable closely in the female connecting part 240A by way of an O-ring (not shown) provided thereon. In addition, the planting structure of the male connecting pipe 239A in the movable plate 103 is made flexible similarly to that of the male connecting pipe 231A shown in FIG. 26(B).

Referring to the ejector cylinder air supply pipe lines 241, 242 and ejector cylinder air discharge pipe lines 243, 244, furthermore, as shown in FIG. 24 and FIGS. 25A, 25B and 25C, the connection ends of the pipe lines 241, 243 on the side of the movable plates 103, 103' are made to be male connecting pipes 241A, 243A which are planted in the side of the movable plates 103, 103' and the connection ends of the pipe lines 242, 244 on the side of the molds 8, 8' are made to be hole-shaped female connecting parts 242A, 244A, whereby the male connecting pipes 241A, 243A are made insertable closely in the female connecting parts 242A, 244A by way of an O-ring (not shown) provided thereon. In addition, the planting structure of the male connecting pipes 241A, 243A to the movable plates 103, 103' is made flexible similarly to that of the male connecting pipe 231A shown in FIG. 26(B).

In the respective pairs of these pipe lines, 231 and 232, 233 and 234, 235 and 236, 237 and 238, 239 and 240, 241 and 242, 243 and 244 provided in the movable plates 103, 103' and molds 8, 8', the connecting directions of these male connecting pipes 231A, 233A, 235A, 237A, 239A, 241A and 243A and the female connecting parts 232A, 234A, 236A, 238A, 240A, 242A and 244A are set so as to be the same direction between these pairs of the pipe lines.

In the blow molding machine 1, namely, the pipe lines 231, 233, 235, 237, 239, 241 and 243 on the side of the movable plates 103, 103' which are the mold fixture plates and the pipe lines 232, 234, 236, 238, 240, 242 and 244 on the side of the molds 8, 8' can be smoothly connected by carrying out the male-female insertion of these male connecting pipes 231A and etc. and these female connecting parts 232A and etc. in such a course that the molds 8, 8' are hung down by a hanging structure mentioned below, for instance in the exchange of molds, and the attaching convex parts 235 on both the sides of said molds 8, 8' are attached by insertion into the attaching concave parts 254 on both the sides of the movable plates 103, 103'.

Since the male connecting pipes 231A and etc. and the female connecting parts 232A and etc. are engaged by insertion by way of the O-ring 245 and etc. there can be maintained the liquid-tightness or gas-tightness between them, simultaneously with their insertion. Accordingly, there is no need of accompanying such a work of holding under pressure any sealing member placed between the connection parts by bolts or the like in order to ensure the liquid-tightness or gas-tightness between the connection parts.

Since the connecting directions of the male connecting pipes 231A and etc. and female connecting parts 232A and etc. in the respective pairs of the pipe lines 231, 232 and etc. are set so as to be the same direction between these pairs of the pipe lines, in a case plural pairs of pipe lines 231, 232 and etc. are provided, the connection of all the pairs of the pipe lines can be completed only by approaching the molds 8, 8' to the movable plates 103, 103' along the aforesaid connecting direction of the male connecting pipes 231A and etc. and the female connecting parts 232A and etc. in the course of fixing the molds 8, 8' to the movable plates 103, 103'.

Since the male connecting pipes 231 and etc. are flexibly planted in the movable plates 103, 103', furthermore, the smooth male-female insertion of the male connecting pipes 231A and etc. in the female connecting parts 232A and etc. can be started, even if the attaching insertion position of the molds 8, 8' to the movable plates 103, 103' is rough.

In the course of attaching the attaching convex parts 253 on both the sides of the molds 8, 8' into the attaching concave parts 254 on both the sides of the movable plates 103, 103' by insertion, in addition, in the blow molding machine 1, the pipe lines 231 and etc. on the side of the movable plates 103, 103' and the pipe lines 232 and etc. on the side of the molds 8, 8'are connected by male-female insertion as mentioned above, and at the same time, the lower end positioning concave parts 255 of the molds 8, 8' are engaged with the lower end positioning convex parts 256 of the movable plates 103, 103' and the lower end surfaces of the molds 8, 8' are mounted on the lower end receiving parts 257 of the movable plates 103, 103', thereby positioning both of them, and then the molds 8, 8' are firmly fixed and retained by the nail 259 of an oil-hydraulic clamping device 258 on the side of the movable plates 103, 103', and thus, the fixing of both of them is completed.

In the blow molding machine 1, however, there is provided such a mold-hanging structure as mentioned below for attaching or detaching the molds 8, 8' to the movable plates 103, 103' which are the mold fixture plates, in the exchange of molds.

As shown in FIG. 22 and FIG. 23, namely, the molds 8, 8'have hook-shaped hanging retainer parts 261, 261' provided on both its sides, respectively, and are made to be capable of being hung up by right and left hangers 262 which are engaged with both these hanging retainer parts 261, 261'. In FIG. 22, in addition, the reference numeral 263 represents a hanging wire, and 264 represents a crane.

Figure 27A:
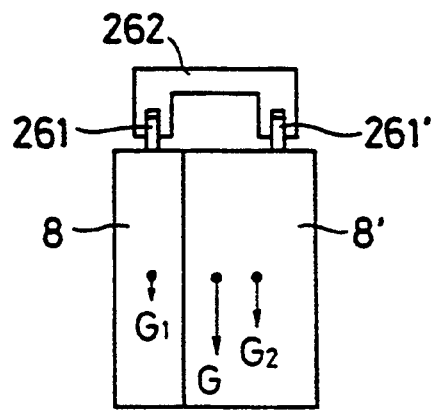
FIG. 27A is a schematic plan view showing a mold hanging structure, in which the hanging retainer parts are positioned along the centers of gravity of the pair of molds.

Now, in the blow molding machine 1, the central position between both the hanging retainer parts 261, 261' is set so as to position on the line of the synthesized center of gravity G of the individual centers of gravity G1, G2 of the pair of said molds 8, 8', as schematically shown in FIG. 27(A).

One mold 8' of the pair of said molds 8, 8' has a balance weight 265 provided thereon. The balance weight 265 on the mold 8' side will almost balance with the weight of the blowing device 202 on the mold 8 side.

In the hangers 262, their portion rising from both the end parts of a retainer pin 266 retained in both the hanging retainer parts 261, 261' is used as a mold opening restraint part 267. Each mold opening restraint part 267 is engaged with each side part of each hanging retainer part 261, 261' to restrain the pair of said molds 8, 8' from opening.

Since the central position between both the hanging retainer parts 261, 261' respectively provided on the pair of said molds 8, 8' is namely set so as to position on the line of the synthesized center of gravity G of the pair of said molds 8, 8' in the blow molding machine 1, the pair of said molds 8, 8' can be horizontally hung up only by retaining and hanging up both these hanging retainer parts 261, 261' with the hanger 262.

By the provision of the balance weight 265 on one mold 8', furthermore in the blow molding machine 1, the line of the synthesized center of gravity G of the pair of said molds 8, 8' can be made to almost accord with the mating surfaces of both the molds 8, 8, and as a result, the hanging retainer parts 261, 261' provided on the respective molds 8, 8' can be installed in access to each other in the vicinity of the same mating surfaces. It is therefore possible to compact the hanger 262 to be retained on both the hanging retainer parts 261, 261'.

Figure 27B:
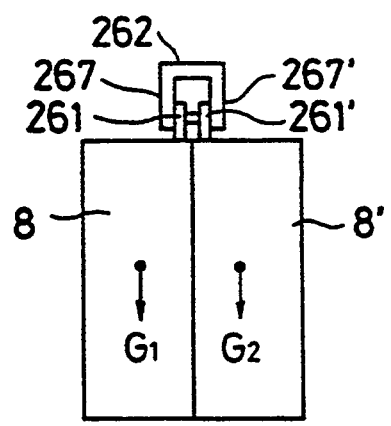
FIG. 27B is a schematic plan view showing a mold hanging structure in which the hanging retainer parts are positioned inside of the centers of gravity of the pair of molds.
Figure 27C:
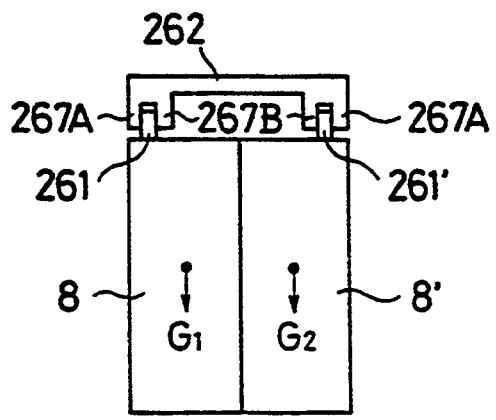
FIG. 27C is a schematic plan view showing a mold hanging structure in which the hanging retainer parts are positioned outside of the centers of gravity of the pair of molds.

In the blow molding machine 1, the gravity applied on each of the molds 8, 8' creates a moment around the hanging retainer part 261, 261' corresponding thereto so that the pair of said molds 8, 8' are apt to be opened from each other at their lower parts, when the molds 8, 8' are hung up under the state that each hanging retainer part 261, 261' is not positioned on the line of the individual center of gravity G1, G1 of each mold 8, 8'. Since the mold opening restraint part 267 of the hanger 262 is engaged with each side part of both the hanging retainer parts 261, 261' to restrain the pair of said molds 8, 8' from opening, at that time, in the aforementioned embodiment, the molds 8, 8' can be restrained from opening, without using any special opening restrainer. FIG. 27(B) shows the state that each hanging retainer part 261, 261' is positioned inside of the individual center of gravity G1, G2 of each mold 8, 8' and the mold opening restraint part 267 on the outside of the hanger 262 is engaged with the side part on the outside of the hanging retainer part 261, 261' opposite thereto, thereby restraining the pair of said molds 8, 8' from opening. And, FIG. 27(C) shows also the state that each hanging retainer part 261, 261' is positioned outside of the individual center of gravity G1, G2 of each mold 8, 8' and the mold opening restraint part 267A on the outside of the hanger 262 and the mold opening restraint part 267B on the inside thereof are respectively engaged with the outer side part and the inner side part of the hanging retainer part 261, 261' opposite thereto, thereby restraining the pair of the molds 8, 8' from opening.

In a rotary blow molding machine, as described in the foregoing, according to the present invention, a pair of idle gears are made to intervene between an annular driven gear provided on a turntable and a driving gear for transmitting the rotation of a motor so as to intermesh with both the gears, whereby any backlash between the respective gears can be eliminated. It is therefore possible to carry out the positioning of said turntable, with higher accuracy.

In a rotary blow molding machine, furthermore, according to the present invention, an extruder for feeding a parison to plural molds mounted on a turntable is composed of a base and an extruder body provided on said base, which is moved in the vertical direction by a lifting drive mechanism and feeds said parison into the molds, when lifted down. It is therefore possible to simplify the structure of the molding machine on the turntable side and to make its weight greater.

In a rotary blow molding machine, according to the present invention, an extruder is made turnable in the horizontal direction with respect to a turntable by a turning drive mechanism. It is therefore possible to simply turn said extruder when the extruder is cleaned, and to easily clean the extruder, because the extruder and the molds on the turntable do not interfere with each other. In addition, it is possible to save the installation space for the rotary blow molding machine.

In a rotary blow molding machine in which a mold clamping unit for opening and shutting a pair of shut-off molds, of plural sets of them, is arranged on a turntable by way of a bed plate, according to the present invention, the pivot of a swing lever of said mold clamping unit is positioned below the height of a pair of guide shafts and the distance between said pivot and the pin pivotally supporting point of an intermediate link at the other end of one clamp rod and the distance between said pivot and the pin pivotally supporting point of an intermediate link on a slide rod are made equidistant, and said pivot is provided midway between the position of the pair of said guide shafts and the position of the top surface of said bed plate. It is therefore possible to uniformly divide the mold clamping force of said mold clamping unit by the pair of said guide plates and the bed plate, with no unnatural load applied on the bed plate and the like. In addition, it is possible to positively retain the opened or shut state of the pair of said shut-off molds by a toggle mechanism simple in structure.

In a parison cutting unit of a blow molding machine, according to the present invention, the cutting start-up position of a cutter is always determined at a given position by a cutter positioning mechanism and said cutter is always rotated in one direction by an actuator. It is therefore possible to cut each parison at the same length at all times.

In a blow molding machine, according to the present invention, a flash shape correcting mechanism is arranged above molds. It is therefore possible to correct the upper end of a parison protruded above the top surface of the molds that is not solidified still to a flatly standing state by the flash shape correcting mechanism.

In a blow molding machine, according to the present invention, a flash shape correcting mechanism and a molding taking-out unit are arranged above molds. It is therefore possible to correct the upper end of a parison protruded above the top surface of the molds that is not solidified still to a flatly standing state by the flash shape correcting mechanism and to easily take out a molding without failure by the molding taking-out unit.

According to the present invention, it is possible to carry out the presealing of a parison, with no formation of any ring mark flaw, to obtain a superior molding by blow-molding a parison while air is enclosed in the parison, and to simplify the control of preblowing, when the preblowing is carried out.

When molds are attached on or detached from a mold fixture plate, according to the present invention, it is possible to omit a setting work of an ejector such as a blow needle or an ejector pin, to make the exchanging workability of the molds satisfactory, and to ensure the smooth motion of said ejector.

When pipe lines on the mold fixture plate side and pipe lines on the mold side are complactly connected simultaneously with the fixing of the molds onto the mold fixture plate, according to the present invention, it is possible to simplify the connecting workability of the pipe lines, and to make the exchanging workability of the molds satisfactory.

According to the present invention, it is possible, by a simple constitution, to hang up a pair of molds horizontally.

According to the present invention, furthermore, it is possible, by a simple constitution, to restrain molds from opening when the molds are hung up.

What is claimed is:

1. In a mold pipe line connecting structure of a molding machine in which a pipe line provided in a mold fixture plate and a pipe line provided in molds are connected with each other under conditions such that the molds are fixed on the mold fixture plate, the improvement wherein:

a connection end of one pipe line of a pair of pipe lines to be connected with each other comprises a male connecting part, and a connection end of the other pipe line of said pair of pipe lines comprises a female connecting part connectable with said male connecting part;

said male connecting part including a small-diametered part which is flexibly fixed and supported in a supporting hole of an elastic plate positioned on either the mold fixture plate or molds; and said male connecting part being insertable into said female connecting part with a sealing material arranged therebetween to seal the connection therebetween;

wherein said sealing material comprises at least one resilient O-ring positioned between said male and female connecting parts.

2. A mold pipe line connecting structure of a molding machine, according to claim 1, wherein said male connecting part comprises a connecting pipe member which is flexibly mounted in a female connecting part on the mold fixture plate.

3. A mold pipe line connecting structure of a molding machine, according to claim 2, wherein said sealing material maintains an air tight connection of said flexibly mounted connecting pipe member. male and female connecting parts.

4. A mold pipe line connecting structure of a molding machine, according to claim 1, wherein said male connecting part comprises a connecting pipe member which is flexibly mounted in a female connecting part on the molds.

5. A mold pipe line connecting structure of a molding machine, according to claim 1, wherein:
said mold fixture plate and said molds have plural pairs of pipe lines which are to be connected, one pipe line of each of said pairs of pipe lines comprising a male connecting part, and the other pipe line of each of said pairs of pipe lines comprising a female connecting part which is connectable with the male connecting part of its connected other pipe line; and
the connecting directions of said male connecting part and said female connecting part of the respective pairs of pipe lines being in the same direction for all of the pairs of the pipe lines.

6. A mold pipe line connecting structure of a molding machine, according to claim 5, wherein said male connecting part comprises a connecting pipe member which is flexibly mounted in a female connecting part on the mold fixture plate.

7. A mold pipe line connecting structure of a molding machine, according to claim 6, wherein said sealing material maintains an air tight connection of said flexibly mounted connecting pipe member.

8. A mold pipe line connecting structure of a molding machine, according to claim 5, wherein said male connecting part comprises a connecting pipe member which is flexibly mounted in a female connecting part on the molds.

9. A mold pipe line connecting structure of a molding machine, according to claim 8, wherein said sealing material maintains an air tight connection of said flexibly mounted connecting pipe member.

* * * * *